United States Patent
Hanatani et al.

(10) Patent No.: US 10,581,598 B2
(45) Date of Patent: Mar. 3, 2020

(54) MANAGEMENT DEVICE AND MANAGEMENT METHOD

(71) Applicant: Kabushiki Kaisha Toshiba, Minato-ku (JP)

(72) Inventors: Yoshikazu Hanatani, Komae (JP); Naoki Ogura, Yokohama (JP); Masanobu Koike, Tama (JP); Hiroyoshi Haruki, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 197 days.

(21) Appl. No.: 15/689,309

(22) Filed: Aug. 29, 2017

(65) Prior Publication Data

US 2018/0270053 A1    Sep. 20, 2018

(30) Foreign Application Priority Data

Mar. 15, 2017    (JP) ................................. 2017-049945

(51) Int. Cl.
    *H04L 9/08*    (2006.01)
(52) U.S. Cl.
    CPC .......... *H04L 9/0833* (2013.01); *H04L 9/0822* (2013.01); *H04L 9/0836* (2013.01); *H04L 9/0844* (2013.01); *H04L 9/0891* (2013.01)
(58) Field of Classification Search
    CPC ... H04L 9/0833; H04L 9/0822; H04L 9/0836; H04L 9/0844; H04L 9/0891
    See application file for complete search history.

(56) References Cited

U.S. PATENT DOCUMENTS

| 7,178,035 B1* | 2/2007 | Glen | G06F 21/602 380/200 |
| 7,813,510 B2* | 10/2010 | Fu | H04L 9/0822 380/279 |
| 2005/0044356 A1* | 2/2005 | Srivastava | H04L 9/0827 713/163 |
| 2007/0263875 A1 | 11/2007 | Kitaya et al. | |

(Continued)

OTHER PUBLICATIONS

O. Rodeh, K. P. Birman, D. Dolev "A study of Group Rekeying", Mar. 16, 2000, Cornell University (Year: 2000).*

(Continued)

*Primary Examiner* — Catherine Thiaw
(74) *Attorney, Agent, or Firm* — Oblon, McClelland, Maier & Neustadt, L.L.P.

(57) ABSTRACT

According to one embodiment, a management device includes a management tree storage and one or more processors. The management tree storage stores therein a binary tree including a plurality of nodes that are assigned with respective node keys. The processors update at least one of the node keys. The processors selects at least one of a first subtree and a second subtree, the first subtree and the second subtree being subtrees including leaf nodes of the binary tree, the leaf nodes corresponding to respective communication devices included in a group, the first subtree including only leaf nodes with the respective node keys assigned thereto not having been updated, the second subtree including only leaf nodes with the respective node keys assigned thereto having been updated. The processors transmit a group key encrypted using a node key assigned to a root node of the selected subtree.

8 Claims, 20 Drawing Sheets

(56) References Cited

U.S. PATENT DOCUMENTS

| | | | |
|---|---|---|---|
| 2008/0165974 A1* | 7/2008 | Inoue | H04L 9/0836 380/279 |
| 2009/0052449 A1* | 2/2009 | Ramakrishnan | H04L 12/1886 370/390 |
| 2013/0191636 A1* | 7/2013 | Aramaki | G06F 21/44 713/168 |
| 2015/0208210 A1 | 7/2015 | Hanatani et al. | |
| 2016/0066354 A1* | 3/2016 | Oba | H04W 4/08 370/392 |

OTHER PUBLICATIONS

"IEEE Standard for Local and metropolitan area networks—Part 21: Media Independent Handover Services Amendment 4: Multicast Group Management", IEEE Std 802.21d, 2015, 106 pages.

B. Weis, et al. "The Group Domain of Interpretation". RFC 6407, 2011, 64 pages.

"Information technology—Security techniques—Key management—Part 5: Group key management", ISO/IEC 11770-5, 2011, 28 pages.

D. Wallner, et al. "Key Management for Multicast: Issues and Architectures", IETF RFC 2627, 1999, 23 pages.

"IEEE Standard for Local and metropolitan area networks—Part 21: Media Independent Services Framework", *IEEE 802.21m*, 2017, 314 pages.

* cited by examiner

MANAGEMENT DEVICE AND MANAGEMENT METHOD

CROSS-REFERENCE TO RELATED APPLICATIONS

This application is based upon and claims the benefit of priority from Japanese Patent Application No. 2017-049945, filed on Mar. 15, 2017; the entire contents of which are incorporated herein by reference.

FIELD

Embodiments described herein relate generally to a management device and a management method.

BACKGROUND

Having been available to protect content to be communicated via multicasting, via which the content is received by a plurality of communication devices, is a method for using a group key that is shared among the communication devices. Also known is a technology for causing a management device that manages the group key to distribute the group key to the communication devices. With this technology, the group key can be distributed at a lower communication cost, for example, when the group key is distributed from the management device using device keys, compared with when the group key is distributed to the individual communication devices.

To maintain the system security, it is preferable for the device keys to be updated on the regular basis. However, when there are many communication devices, it takes a long time for the device key of every communication device to be updated, for example, when an authenticated key exchange protocol established between two parties is used in distributing the updated device keys. With such a conventional technology, the availability of the system sometimes declines, because the group key cannot be distributed until updating of the device keys of the entire communication devices is completed.

DETAILED DESCRIPTION

According to one embodiment, a management device includes a management tree storage and one or more processors. The management tree storage stores therein a binary tree including a plurality of nodes that are assigned with respective node keys. The processors update at least one of the node keys. The processors selects at least one of a first subtree and a second subtree, the first subtree and the second subtree being subtrees including leaf nodes of the binary tree, the leaf nodes corresponding to respective communication devices included in a group, the first subtree including only leaf nodes with the respective node keys assigned thereto not having been updated, the second subtree including only leaf nodes with the respective node keys assigned thereto having been updated. The processors transmit a group key encrypted using a node key assigned to a root node of the selected subtree.

A management device according to some preferred embodiments will now be explained in detail.

As technologies for distributing a group key using device keys, there have been a plurality of known technologies in which the device keys are configured differently, and used differently. For example, IEEE 802.21d specifies the group key distribution protocol as described below. A management device managing a group shares a common key for distributing the group key with communication devices, and such a common key is referred to as a device key. The management device then encrypts the group key using the device key, and sends the encrypted group key. In this manner, the group key can be sent to the communication devices securely, only if such communication devices belong to a multicast group.

The device key can be shared using a known technology, such as the authenticated key exchange protocol established between two parties. When the device key is updated in order to maintain security, there have been cases in which the system availability declines because the group key cannot be distributed until updating of the entire device keys is completed. Therefore, in the embodiments described below, the group key is enabled to be distributed even before updating of the device keys of the entire communication devices is completed.

First Embodiment

Figure 1:
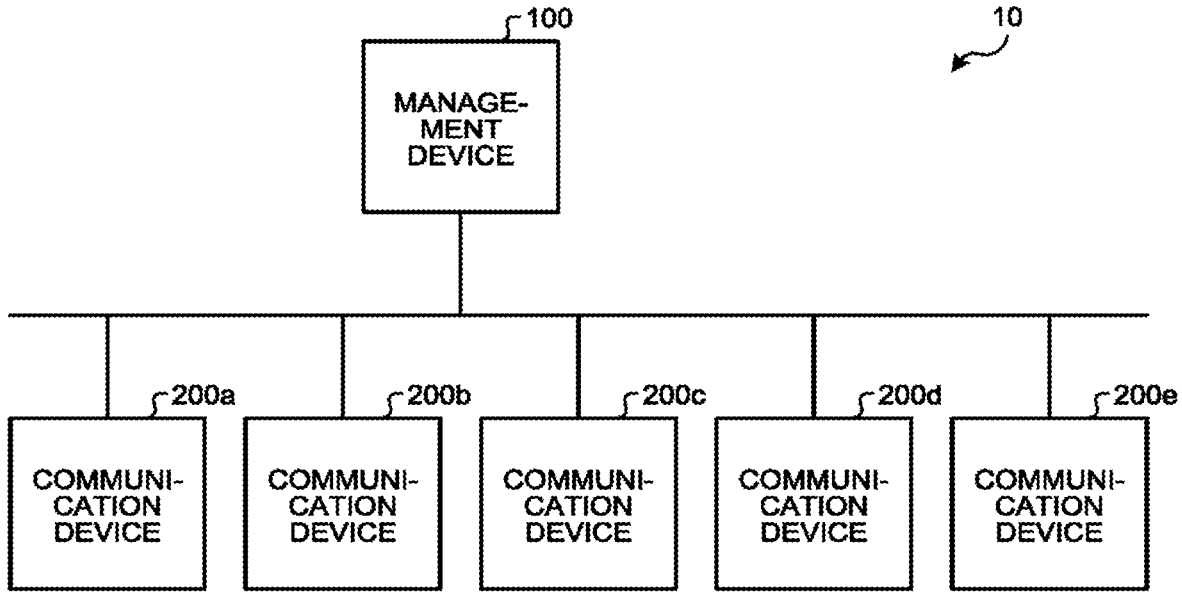
FIG. 1 is a block diagram of a communication system according to a first embodiment.

FIG. 1 is a block diagram illustrating an exemplary configuration of the communication system 10 according to the first embodiment. As illustrated in FIG. 1, the communication system 10 includes a management device 100, and communication devices 200a to 200e. Because the communication devices 200a to 200e all have the same functions, in the explanation hereunder, the communication devices 200a to 200e will be simply referred to as communication devices 200 when it is not necessary to distinguish one another. The number of communication devices 200 is not limited to five, and may be any number.

The management device 100 is a communication control device that controls the communication devices 200. The management device 100 has a function, for example, for distributing a group key using the device key that is shared with a communication device 200. The management device 100 and the communication devices 200 are connected to one another over a network. The network may be a wired network, a wireless network, or any other type of network.

Executed between the management device 100 and each of the communication devices 200 is an authenticated key exchange protocol for a mutual authentication and for key sharing. The device key is shared between the management device 100 and each of the communication devices 200 by causing the management device 100 to encrypt the device key using the shared key, which is established as a result of executing the authenticated key exchange protocol, and to send the encrypted device key to the communication device 200. The management device 100 encrypts the group key that is to be used in encrypted communication using a part of the device key, and distributes the encrypted group key to each of the communication devices 200. As examples of the authenticated key exchange protocol, various known technologies have been known, including the protocol according to RFC5191.

Figure 2:
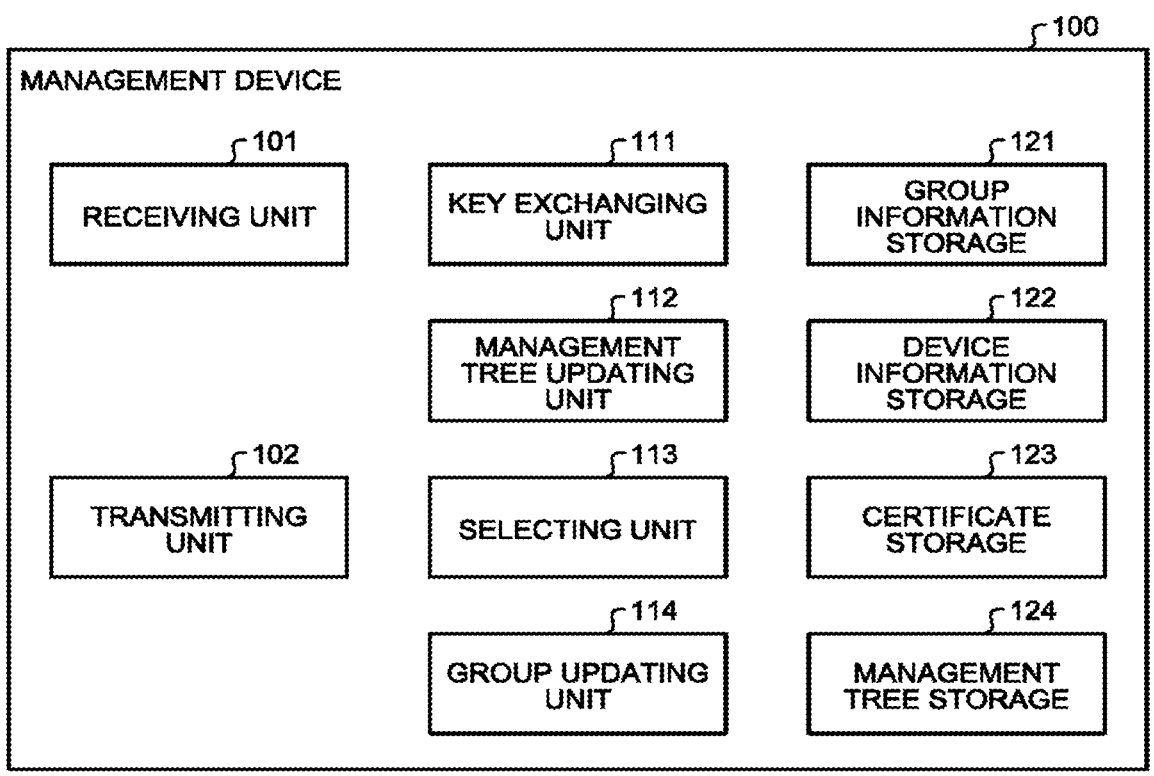
FIG. 2 is a block diagram of a management device according to the first embodiment.

FIG. 2 is a block diagram illustrating an exemplary functional configuration of the management device 100 according to the first embodiment. As illustrated in FIG. 2, the management device 100 includes a receiving unit 101, a transmitting unit 102, a group information storage 121, a device information storage 122, a certificate storage 123, a management tree storage 124, a key exchanging unit 111, a management tree updating unit 112, a selecting unit 113, and a group updating unit 114.

The receiving unit 101 receives various types of information from an external device, e.g., another management device and the communication device 200. For example, the receiving unit 101 receives a group updating request from the external device.

The transmitting unit 102 transmits various types of information to an external device, e.g., another management device and the communication device 200. For example, the transmitting unit 102 transmits the encrypted group key to a communication device 200 belonging to a corresponding group.

The group information storage 121 stores therein group information for managing the groups to which the communication devices 200 belong. For example, the group information storage 121 stores therein group information that is a set including a piece identification information (group ID) for identifying a group, a group key, and pieces of identification information (device IDs) for identifying the communication devices 200 that are the members of the group identified by the group ID.

The device information storage 122 stores therein device information for managing the communication devices 200. For example, the device information storage 122 stores therein device information that is the device ID assigned to each of the communication devices 200, paired with the device key shared with the communication device 200.

The certificate storage 123 stores therein a certificate used in the authenticated key exchange, paired with a corresponding piece of secret information. The certificate may be selected as appropriate, based on the mutual authentication protocol used, such as a certificate for a public key, or a certificate for a preliminary shared key. In the embodiment, the management device 100 is provided with a certificate that is issued only to a legitimate management device 100, and corresponding secret information, in advance.

The management tree storage 124 stores therein a management tree for managing the device keys. For example, the management tree storage 124 stores therein a management tree that is a binary tree including a plurality of nodes each of which is assigned with a node key. A set of a plurality of node keys correspond to one device key, as will be explained later.

Figure 3:
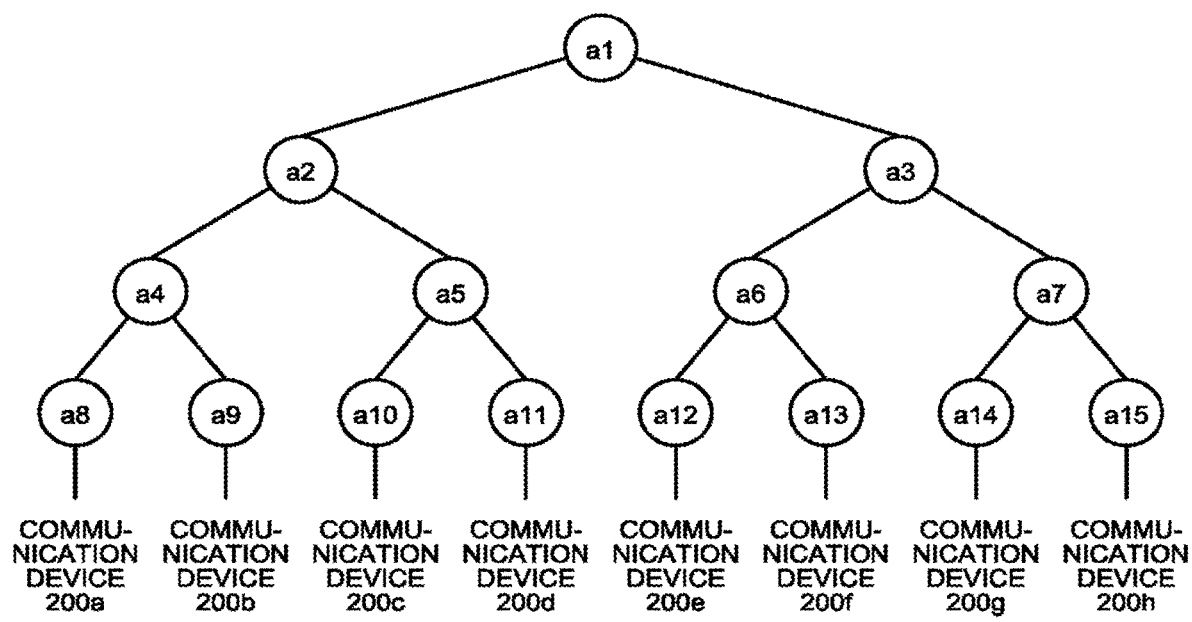
FIG. 3 is a schematic illustrating an example of a management tree used in a complete subtree (CS) method.

FIG. 3 is a schematic illustrating an example of the management tree used in the complete subtree (CS) method that is used in managing the device keys of the eight respective communication devices 200. As illustrated in FIG. 3, the management tree is a binary tree having eight leaf nodes, and has fifteen nodes from a1 to a15. The node a1 having no parent node is referred to as a root node, and the nodes a8 to a15 having no child node are referred to as leaf nodes. One communication device is assigned to each of the leaf nodes. In the management tree used in the CS method, each of the nodes retains identification information (node ID) for uniquely identifying the node, and a node key that is an encryption key assigned to the node.

Given to each of the communication devices 200 by the management device 100 as a device key are pairs of a node and a node key that are assigned to each node on the path from the root node to the leaf node to which this communication device 200 is assigned. For example, the communication device 200a illustrated in FIG. 3 retains four pairs of a node ID and a node key that are assigned to the nodes a1, a2, a4, and a8, respectively, as a device key.

Before distributing the group key, the management device 100 acquires a subtree having only the leaf nodes assigned with the communication devices 200 to which the group key is to be distributed, encrypts the group key using the node key assigned to the root node of the subtree, and sends the encrypted group key. A set of the encrypted group keys to be sent is referred to as group key data.

For example, to send a group key to the communication devices 200a, 200b, 200c, 200d, 200e, 200f, 200g, 200h, the management device 100 sends an encrypted text c that is an encryption of the group key encrypted with the node key assigned to the root node a1 of the subtree having only the leaf nodes a8, a9, a10, a11, a12, a13, a14, and a15 assigned to the respective communication devices 200 as the leaf nodes. Because every one of the communication devices 200 retains the node key that is assigned to a1 as a component of its device key, these communication devices 200 can acquire the group key by decrypting the encrypted text c.

When a group key is to be sent only to the communication devices 200a, 200e, 200f, 200g, 200h, the management device 100 sends an encrypted text c1 which is an encryption of the group key encrypted with the node key that is assigned the root node a8 of the subtree including only a8 as a leaf node, and an encrypted text c2 that is an encryption of the group key encrypted with the node key assigned to the root node a3 of the subtree including only a12, a13, a14, a15 as the leaf nodes. Because the communication devices 200a, 200e, 200f, 200g, 200h have the node key assigned to either a8 or a3 as a component of the device key, the communication devices 200a, 200e, 200f, 200g, 200h can acquire the group key by decrypting c1 or c2. The communication devices 200b, 200c, 200d cannot acquire the group key from c1 or c2, because these communication devices do not have the node key assigned to either a8 or a3.

In the manner described above, in the first embodiment, the group key is distributed only to the desired communication devices 200 using the CS method. In the CS method, the management device 100 has a management tree, and the communication device 200 has a device key. The group key is encrypted using device keys selected depending on the desired communication devices 200. The CS method is described in detail in IEEE Std 802.21d-2015, 802.21d-2015—IEEE Standard for Local and metropolitan area networks—Part 21: Media Independent Handover Services Amendment 4: Multicast Group Management, for example.

The CS method also provides a function for disabling a device key assigned to a communication device 200 when the leakage of the device key occurs. For example, each node in the management tree retains a disabling flag having 0 as an initial value. When the leakage of a device key occurs, the management device 100 changes the disabling flag of the node corresponding to the node ID included in the leaked device key to 1. The management device 100 refrains from using any node having a disabling flag set to 1, in the subsequent group key distribution. In this manner, the communication device 200 having its device key disabled cannot receive distribution of the group key subsequently, and the group key can be kept concealed from an attacker who has the leaked device key.

Described above is the minimum process for explaining the functions of the CS method. The management device 100 may, however, include any other processes. For example, in addition to the process described above, the management device 100 may be configured to return, when a group key cannot be distributed to a designated group member without using a disabled node, an alarm notifying that there is a disabled communication device 200 in the designated members.

Figure 4:
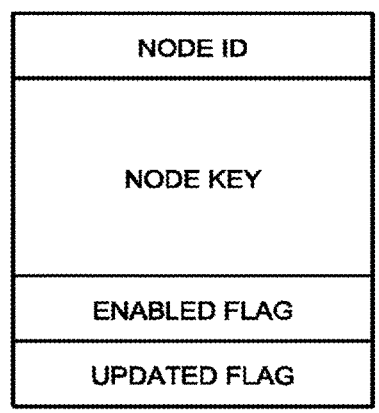
FIG. 4 is a schematic illustrating an example of information assigned to a node in the management tree according to the first embodiment.

FIG. 4 is a schematic illustrating an example of the information assigned to each node. As illustrated in FIG. 4, an enabled flag and an updated flag, in addition to the node ID and the node key, are assigned to each node. The enabled flag and the updated flag are information used in managing the update status of the device key, and used in distributing the group key while device keys are being updated, as will be described later.

For example, the enabled flag is used as information for determining whether the assigned node key can be used for encryption. 1 is set to the enabled flag when the node key assigned to the node can be used in encryption, and 0 is set when the node key assigned to the node cannot be used in encryption, for example. The updated flag is information indicating whether the node key corresponding to the node has been updated. 1 is set to the updated flag when the node key has been updated, and 0 is set when the node key has not been updated yet, for example. In the embodiment, the enabled flag and the updated flag are assigned to every node (first node) included in the management tree.

Referring back to FIG. 2, the key exchanging unit 111 executes the authenticated key exchange protocol. For example, the key exchanging unit 111 performs the mutual authentication with the communication device 200, using a certificate stored in the certificate storage 123, and establishes a shared key between two parties of the management device 100 and the communication device 200. The key exchanging unit 111 inspects whether the communication device 200 that is the other party of the mutual authentication is a device to which an updated device key can be assigned, by inspecting whether the certificate of the communication device 200 is a certificate issued only to legitimate communication device 200, and is not a disabled device.

The management tree updating unit 112 performs the process of updating the device key shared with each of the communication devices 200. Because a set of a plurality of node keys corresponds to a device key, as mentioned earlier, updating the node key of each of the nodes corresponds to updating of a device key.

The selecting unit 113 selects a subtree having leaf nodes that are assigned to the communication devices 200 to which a group key is to be distributed, among the subtrees of the management tree. The selecting unit 113 selects, for example, at least one of a subtree including only leaf nodes with the respective node keys assigned thereto not having been updated yet (first subtree), and a subtree including only leaf nodes with the respective node keys assigned thereto having been updated (second subtree). The first subtree and the second subtree include the leaf nodes that correspond to respective communication devices 200 included in the group.

For example, to begin with, the selecting unit 113 selects a subtree including the leaf nodes corresponding to the communication devices 200 included in the group from the management tree, based on the CS method. The selecting unit 113 then selects a subtree including the nodes having been determined to have node keys that can be used in encryption, by referring to the determination information, among the subtrees selected with the CS method. In other words, the selecting unit 113 selects a subtree including nodes assigned with the enabled flag (enabled flag=1), indicating that the node key can be used in encryption, by referring to the enabled flag as the determination information.

The group updating unit 114 executes a group updating process. For example, the group updating unit 114 generates information (group key data) for distributing a group key only to the communication devices 200 that are to be the members of the group, by referring to the management tree stored in the management tree storage 124, the device information stored in the device information storage 122, the group information stored in the group information storage 121, and the information of the communication devices 200 that are to be the members of the group. The group key data is transmitted by the transmitting unit 102 to the communication devices 200 belonging to the corresponding group, for example.

The units described above (the receiving unit 101, the transmitting unit 102, the key exchanging unit 111, the management tree updating unit 112, the selecting unit 113, and the group updating unit 114) are implemented as one or more processors, for example. For example, the units described above may be implemented by causing a processor such as a central processing unit (CPU) to execute a computer program, that is, as software. The units described above may be implemented as a processor such as a dedicated integrated circuit (IC), that is, as hardware. The units described above may be implemented using software and hardware in combination. When a plurality of processors are to be used, each of the processors may implement corresponding one of the units, or two or more units.

The storages (the group information storage 121, the device information storage 122, the certificate storage 123, and the management tree storage 124) may be provided using any storage medium that is generally used, such as a hard disk drive (HDD), an optical disc, a memory card, or a random access memory (RAM).

Figure 5:
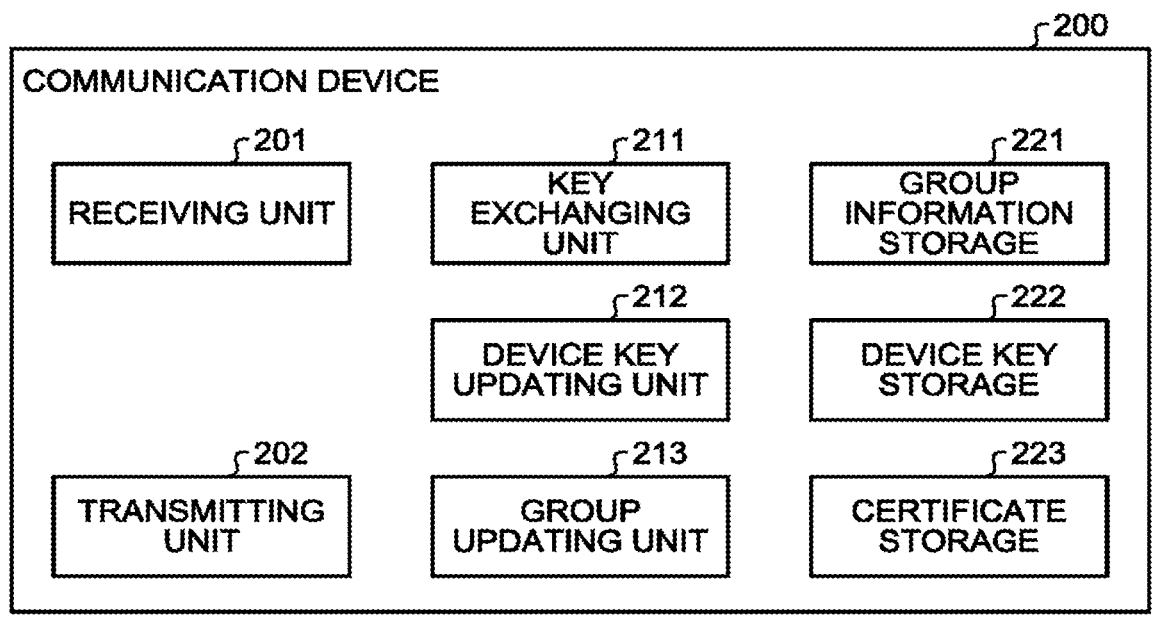
FIG. 5 is a block diagram of a communication device according to the first embodiment.

FIG. 5 is a block diagram illustrating an exemplary functional configuration of the communication device 200 according to the first embodiment. As illustrated in FIG. 5, the communication device 200 includes a receiving unit 201, a transmitting unit 202, a group information storage 221, a device key storage 222, a certificate storage 223, a key exchanging unit 211, a device key updating unit 212, and a group updating unit 213.

The receiving unit 201 receives various types of information from an external device such as the management device 100. For example, the receiving unit 201 receives information such as a device key updating request, an updated device key, and the group key data from the management device 100. The transmitting unit 202 transmits various types of information to an external device such as the management device 100.

The group information storage 221 stores therein the group information for managing the groups to which the communication device 200 belongs. For example, the group information storage 221 stores therein the group information representing the group ID paired with the group key of a group to which the communication device 200 belongs as a member. The device key storage 222 stores therein the device key assigned by the management device 100.

The certificate storage stores therein a certificate used in the authenticated key exchange, paired with corresponding secret information. The certificate may be selected as appropriate, based on the mutual authentication method to be used, such as a certificate for a public key, and certificate for a preliminary shared key. In the embodiment, the communication device 200 is provided with a certificate that is issued only to the management device 100, and corresponding secret information, in advance.

The key exchanging unit 211 executes the authenticated key exchange protocol. For example, the key exchanging unit 211 performs the mutual authentication with the management device 100 using the certificate stored in the certificate storage 223, and establishes a shared key between two parties of the management device 100 and the communication device 200. The key exchanging unit 211 inspects whether the management device 100 is qualified to update the device key, by inspecting whether the certificate of the management device 100 that is the other party of the mutual authentication is a certificate issued only to a legitimate management device 100.

The device key updating unit 212 executes a device key updating process. The group updating unit 213 executes a group key updating process.

The units described above (the receiving unit 201, the transmitting unit 202, the key exchanging unit 211, the device key updating unit 212, and the group updating unit 13) are implemented by one or more processors, for example. For example, the units described above is implemented by causing a processor such as a CPU to execute a computer program, that is, implemented as software. The units described above may also be implemented as a processor such as a dedicated IC, that is, as hardware. The units described above may be implemented using software and hardware in combination. When a plurality of processors are to be used, each of the processors may implement corresponding one of the units, or two or more units.

Figure 6:
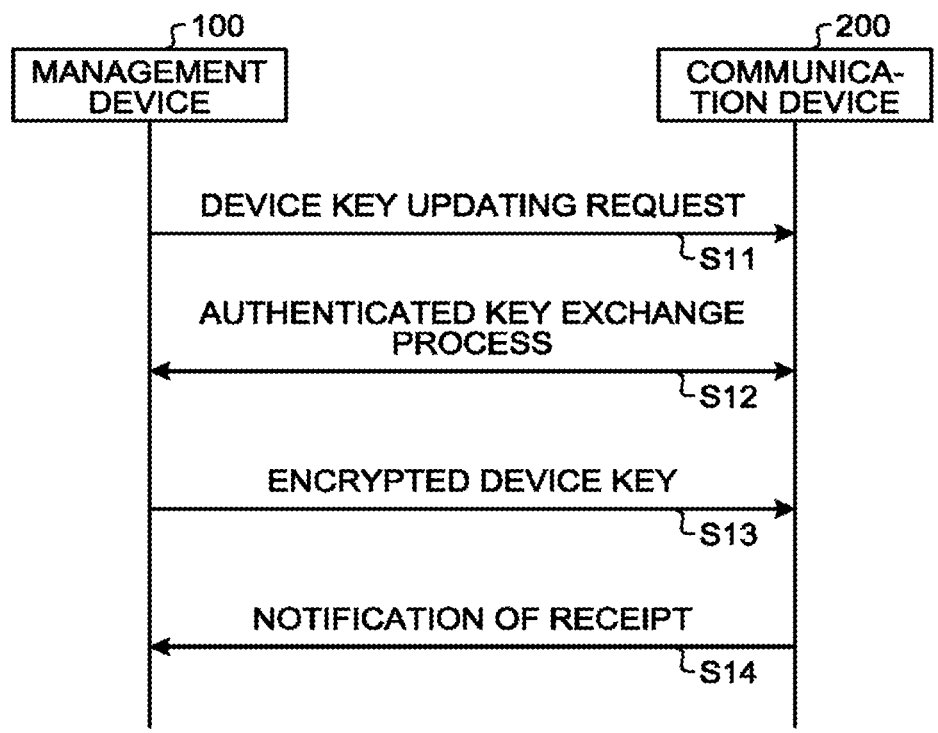
FIG. 6 is a sequence chart of a device key updating process in the first embodiment.

The storages (the group information storage 221, the device key storage 222, and the certificate storage 223) may be provided using any storage medium that is generally used, such as an HDD, an optical disc, a memory card, or a The device key updating process performed in the communication system 10 according to the first embodiment and having the configuration described above will now be generally explained with reference to FIG. 6. FIG. 6 is a sequence chart illustrating an example of the device key updating process in the first embodiment. The management device 100 executes the device key updating process illustrated in FIG. 6 with every communication device 200 that is not disabled.

The management device 100 transmits a device key updating request to the communication device 200 (Step S11), and executes the authenticated key exchange process (Step S12). If the authenticated key exchange process has succeeded, a shared key K is established between the management device 100 and the communication device 200. In the embodiment, if the establishment of the shared key K fails, the subsequent steps will not be executed. The management device 100 may also be configured to retransmit the device key updating request, when the establishment fails, and repeat the process, up to a predetermined number of times.

The management device 100 calculates an updated device key that is to be newly assigned to the communication device 200, and transmits the encrypted device key which is an encryption of the updated device key with the shared key K (Step S13).

The communication device 200 decrypts the encrypted device key into the device key in a plain text, using the shared key K. Once the device key is successfully acquired, the communication device 200 transmits a notification of receipt to the management device 100 (Step S14). In the embodiment, if the acquisition of the device key fails, the subsequent steps will not be executed. The communication device 200 may also be configured to transmit a notification of failure, when the acquisition fails, and to repeat the preceding process, such as the authenticated key exchange process, up to a predetermined number of times.

Figure 7:
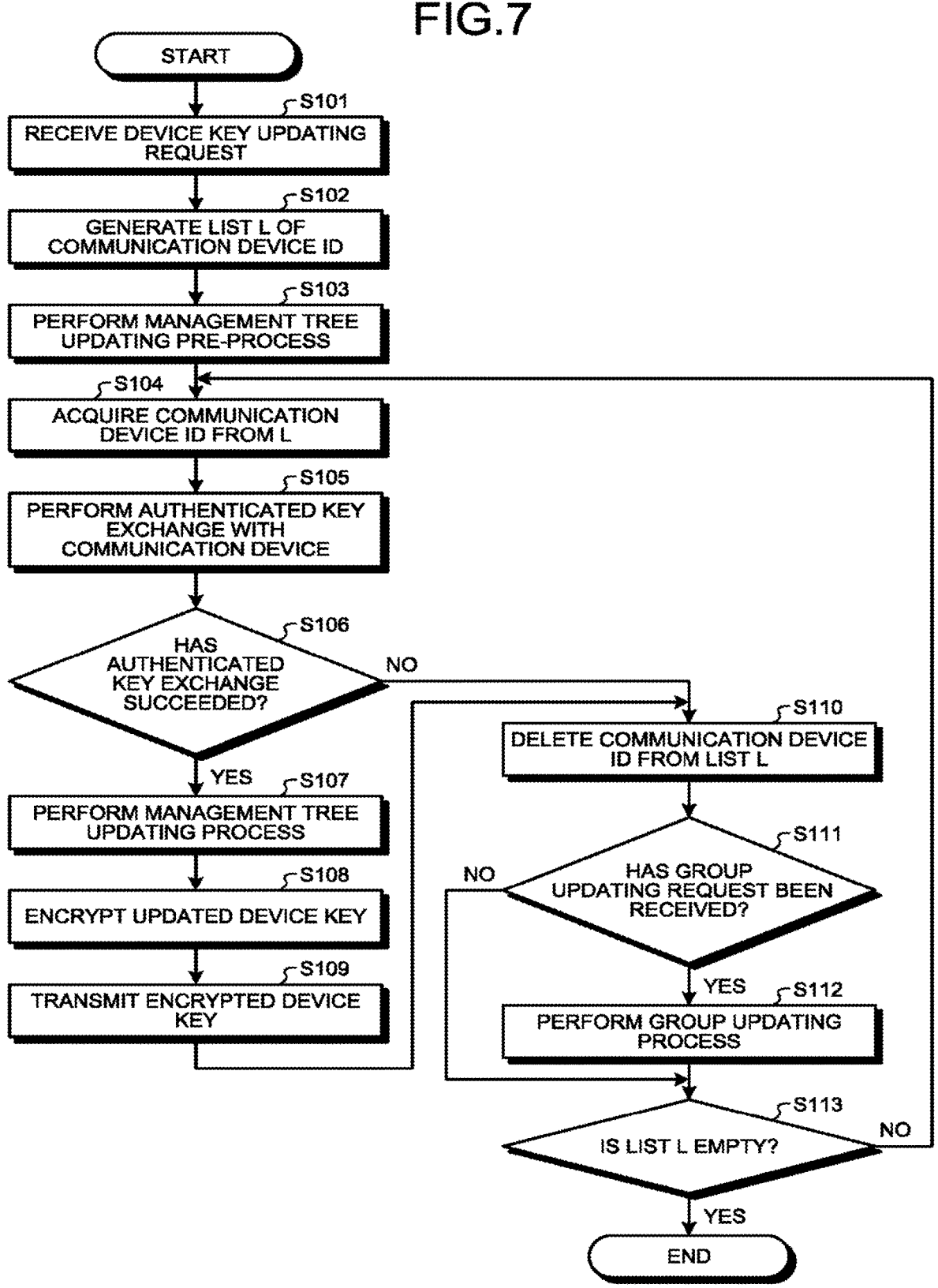
FIG. 7 is a flowchart of the device key updating process according to the first embodiment.

The device key updating process will now be explained further in detail. FIG. 7 is a flowchart illustrating an example of the device key updating process performed in the management device 100.

The receiving unit 101 receives a device key updating request (Step S101). The device key updating request is issued based on a policy separately specified, e.g., on the regular basis, or an event of a system compromise. The device key updating request may be issued in the management device 100, or may be issued by another management device, for example.

When the device key updating request is received, the management tree updating unit 112 in the management device 100 starts the device key updating process. The management tree updating unit 112 creates a list L including the device ID of every communication devices 200 that is not currently disabled (Step 102).

The management tree updating unit 112 executes the management tree updating pre-process (Step S103). The management tree updating pre-process will be described later in detail.

The management tree updating unit 112 selects one of the device IDs of the communication devices 200 from the list L (Step 104). In the explanation hereunder, the communication device 200 corresponding to the selected device ID will also be referred to as a communication device x.

The key exchanging unit 111 executes the authenticated key exchange with the communication device x, and establishes the shared key K (Step S105). The management tree updating unit 112 determines whether the authenticated key exchange ha succeeded (Step S106). If the exchange has succeeded (Yes at Step S106), the management tree updating unit 112 executes the management tree updating process for updating the device key and the management tree of the device keys (Step S107). The management tree updating process will be described later in detail. In the explanation hereunder, the list of updated device keys is referred to as L_ndk.

The management tree updating unit 112 generates an encrypted device key that is an encryption of the corresponding updated device key included in the list L_ndk, encrypted with the shared key K (Step S108). The transmitting unit 102 then transmits the encrypted device key to the corresponding communication device 200 (Step S109).

If the authenticated key exchange fails (No at Step S106), and after the encrypted device key is transmitted, the management tree updating unit 112 removes the device ID of the communication device x from the list L (Step S110).

The receiving unit 101 determines whether the group updating request has been received (Step S111). If the group updating request has been received (Yes at Step S111), the group updating unit 114 executes the group updating process (Step S112). The group updating process will be described later in detail.

If the group updating request has not been received (No at Step S111), and after the group updating process is completed, the management tree updating unit 112 determine whether the list L is empty (Step S113). If the list L is not empty (No at Step S113), the system control is returned to Step S104, and the process is repeated. If the list L is empty (Yes at Step S113), the device key updating process is ended.

Through the process described above, the device key stored in the device information storage 122 and the management tree stored in the management tree storage 124 are updated, and the updated device keys are transmitted to the communication devices 200, respectively.

In the embodiment, it is determined whether the group updating request has been received during the device key updating process, and if the request has been received, the group updating process is executed (Step S111, Step S112). In the group updating process, the group key is distributed using an unupdated device key and an updated device key in a manner distinguished from each other. In this manner, the group key can be distributed even before the update of the device keys of the entire communication devices 200 is completed.

In the example illustrated in FIG. 7, it is determined whether the group updating request has been received every time the device key corresponding to one communication device 200 is updated. The timing at which the process of determining whether a group updating request has been received, and the process of updating the group are performed is not limited thereto, and these processes may be performed at any timing as long as the group is updated while the device keys are being updated. For example, these processes may be performed at timing at which the device keys of a plurality of communication devices 200 have been updated. These group updating request determining process and group updating process may be performed a plurality of number of times within a loop of the device key updating process performed for each of the communication devices 200. These group updating request determining process and group updating process may also be performed at any timing, independently from the device key updating process, without performing these processes within the sequence of the device key updating process.

Figure 8:
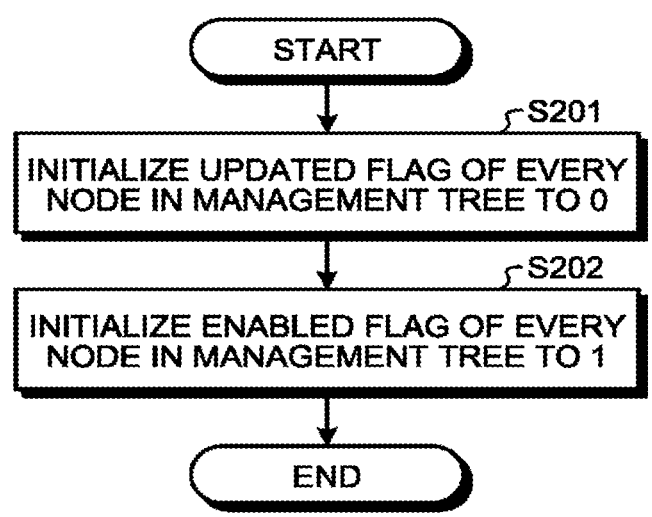
FIG. 8 is a flowchart of a management tree updating pre-process according to the first embodiment.

FIG. 8 is a flowchart illustrating an example of a management tree updating pre-process. The management tree updating unit 112 sets the updated flag of every node in the management tree stored in the management tree storage 124 to 0 (Step S201), and sets the enabled flag to 1 (Step S202).

Figure 9:
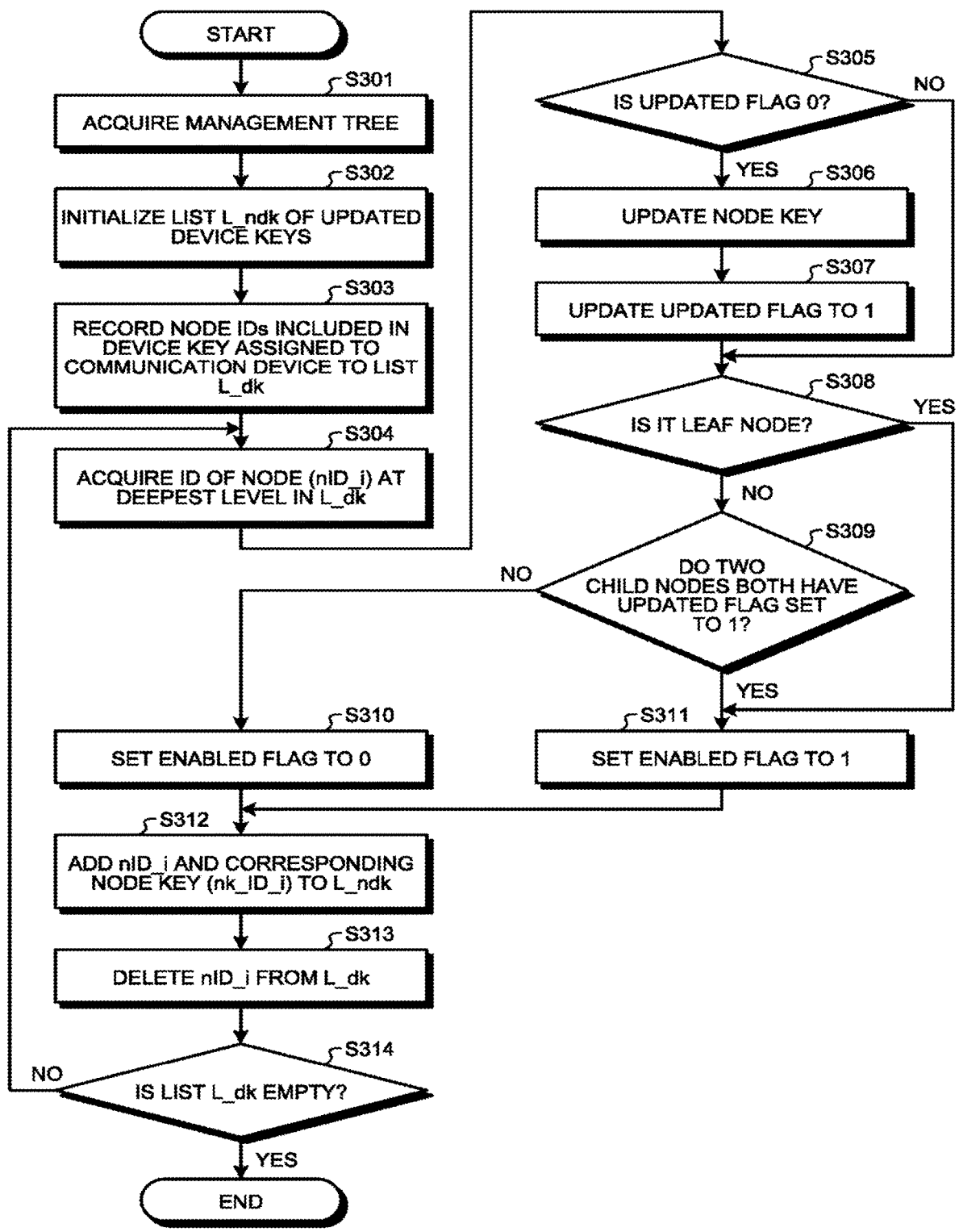
FIG. 9 is a flowchart of a management tree updating process according to the first embodiment.

FIG. 9 is a flowchart illustrating an example of the management tree updating process. The management tree updating unit 112 reads the management tree from the management tree storage 124 (Step S301). The management tree updating unit 112 initializes the list L_ndk for recording the updated device keys by setting an empty set thereto (Step S202). The management tree updating unit 112 records the entire node IDs included in the device key assigned to the communication device x, to a list L_dk (Step S303).

For the purpose of explanation, the node IDs included in the device key assigned to communication device x are denoted as nID_0, . . . , nID_n, respectively. For example, if the communication device 200a in FIG. 3 is the communication device x, four node IDs (nID_0, nID_1, nID_2, nID_3) corresponding to the nodes a1, a2, a4, and a8 are recorded in the list L_dk.

The management tree updating unit 112 reads the node ID of the node at the deepest level in the management tree, from the node IDs included in the list L_dk (Step S304). The read node ID is herein denoted as nID_i. For example, assuming that the communication device 200a illustrated in FIG. 3 is the communication device x, the management tree updating unit 112 reads, in this initial process, the node ID of the node a8 that is located at a deepest level.

The management tree updating unit 112 determines whether the updated flag corresponding to nID_i is 0 (Step S305). If the updated flag corresponding to nID_i is 0 (Yes at Step S305), the management tree updating unit 112 generates a new node key nk_ID_i, and updates the node key corresponding to nID_i with the generated node key nk_ID_i (Step S306). The management tree updating unit 112 then sets the updated flag corresponding to nID_i to 1 (Step S307).

If the updated flag is not 0, that is, 1 (No at Step S305), or after the updated flag is set to 1 at Step S307, the management tree updating unit 112 determines whether nID_i is a leaf node (Step S308). If nID_i is not a leaf node (No at Step S308), the management tree updating unit 112 determines whether the two child nodes of nID_i both have their updated flag set to 1 (Step S309).

If nID_i is a leaf node (Yes at Step S308), or if the two child nodes of nID_i both have their updated flag set to 1 (Yes at Step S309), the management tree updating unit 112 sets the enabled flag of nID_i to 1 (Step S311). If at least one of the two child nodes of nID_i has its updated flag set to 0 (No at Step S309), the management tree updating unit 112 sets the enabled flag of nID_i to 0 (Step S310).

In the example illustrated in FIG. 9, the enabled flag is set to 1 under one of the following conditions: when the node is a leaf node; when both of the node keys assigned to the two child nodes have been updated; and when both of the node keys assigned to the two child nodes have not been updated. With the enabled flag set in the manner described above, it becomes possible to control not to use the node key of a node with child nodes having their node keys unupdated and updated, in the encryption of the group key.

The management tree updating unit 112 then adds nID_i and the node key nk_ID_i to the list L_ndk (Step S312). The management tree updating unit 112 then deletes the nID_i from the list L_dk (Step S313).

The management tree updating unit 112 then determines whether the list L_dk is empty (Step S314). If the list L_dk is not empty (No at Step S314), the system control is returned to Step S304, and the process is repeated. If the list L_dk is empty (Yes at Step S314), the management tree updating process is ended.

The enabled flag set in the manner described above is referred to in determining whether a node key can be used in the group updating process, which is described later. By setting the enabled flag in the management tree updating process, the load in determining whether the node key can he used can be reduced, during the group updating process.

Figure 10:
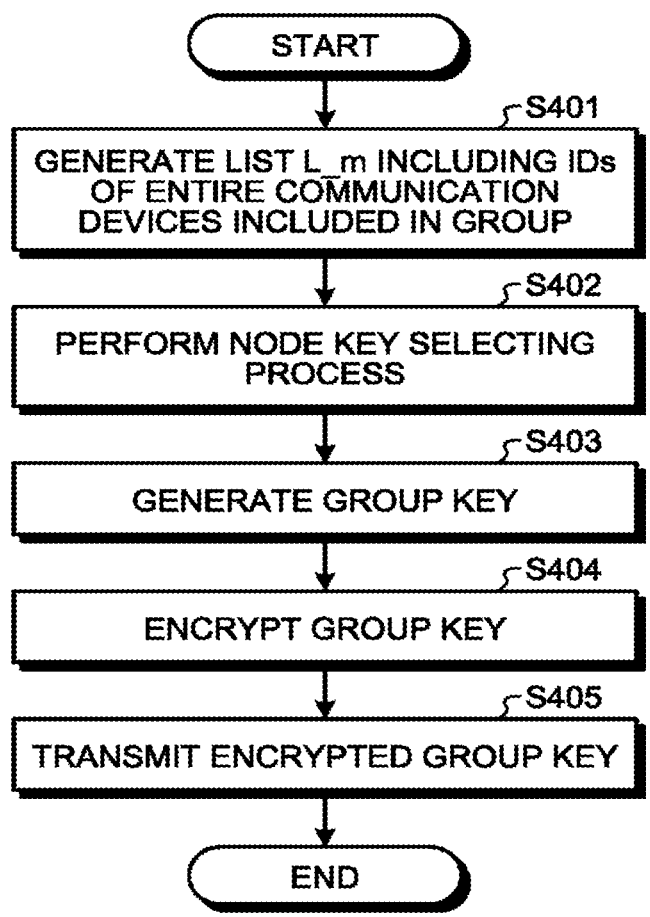
FIG. 10 is a flowchart of a group updating process according to the first embodiment.

FIG. 10 is a flowchart illustrating an example of the group updating process. The group updating unit 114 generates a list L_m in which the device IDs of the entire communication devices 200 that are to be a member of the updated group is recorded (Step S401). The selecting unit 113 performs a node key selecting process, and generates a list L_cs of the rode IDs (Step S402). Registered to the list L_cs is at least one of the node ID of the root node of a subtree (first subtree) including only the leaf nodes with the respective node keys assigned thereto not having been updated and the node ID of the root node of a subtree (second subtree) including only the leaf nodes with the respective node keys assigned thereto having been updated. The node key selecting process will be described later in detail.

The group updating unit 114 generates a group key to be used in the updated group (Step S403). The group updating unit 114 generates group key data by encrypting the generated group key using one or more node keys corresponding to one or more respective nodes ID recorded in the list L_cs (Step S404). The transmitting unit 102 distributes the information (group update information) including the group key data and the group ID for identifying the group to be updated to the multicast group including the communication devices 200 to be updated, for example (Step S405).

Figure 11:
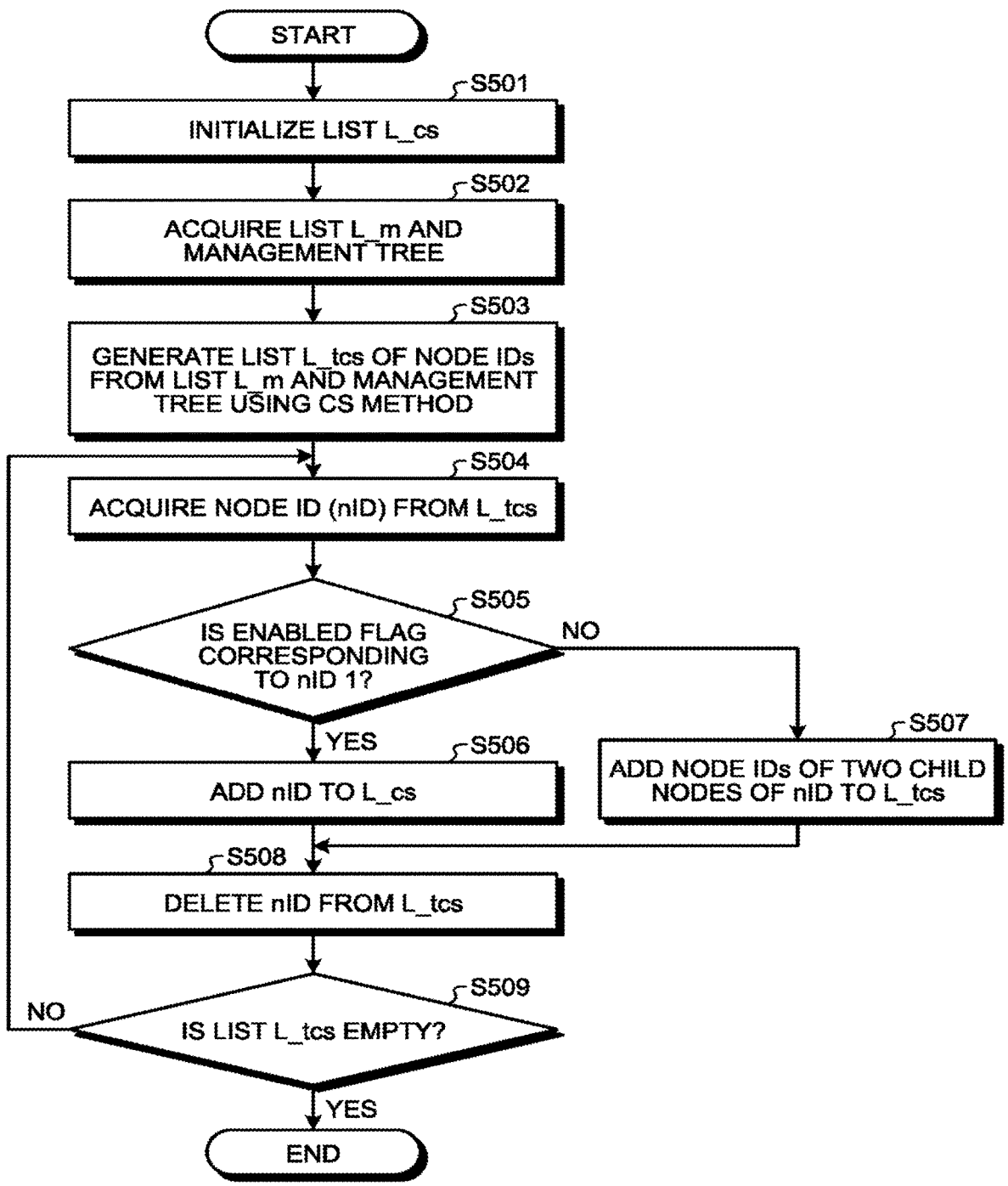
FIG. 11 is a flowchart of a node key selecting process according to the first embodiment.

FIG. 11 is a flowchart illustrating an example of the node key selecting process. The selecting unit 113 initializes the list L_cs by setting an empty set thereto (Step S501). The selecting unit 113 reads the list L_m and the management tree (Step S502). The selecting unit 113 calculates a list L_tcs of node IDs from the list L_m and the management tree using the CS method (Step S503).

As described above, obtained with the CS method is a subtree only having the leaf nodes assigned to the communication devices 200 to which the group key is to be distributed (the communication devices 200 whose device IDs are recorded in the list L_m). The node ID of the root node of the subtree obtained in the manner described above is recorded in the list L_tcs.

The selecting unit 113 reads a node ID from the list L_tcs (Step S504). The read node ID is referred to as nID. The selecting unit 113 then determines whether the enabled flag corresponding to nID is 1 (Step S505). If the enabled flag corresponding to nID is 1 (Yes at Step S505), the selecting unit 113 adds nID to the list L_cs (Step S506). If the enabled flag corresponding to nID is 0 (No at Step S505), the selecting unit 113 adds the node IDs of the two child nodes of nID (cnID1, cnID2) to the list L_tcs (Step S507). The selecting unit 113 then deletes nID from the list L_tcs (Step S508).

The selecting unit 113 determines whether the list L_tcs is empty (Step S509). If the list L_tcs is not empty (No at Step S509), the system control is returned to Step S504, and the process is repeated. If the list L_tcs is empty (Yes at Step S509), the node key selecting process is ended.

Figure 12:
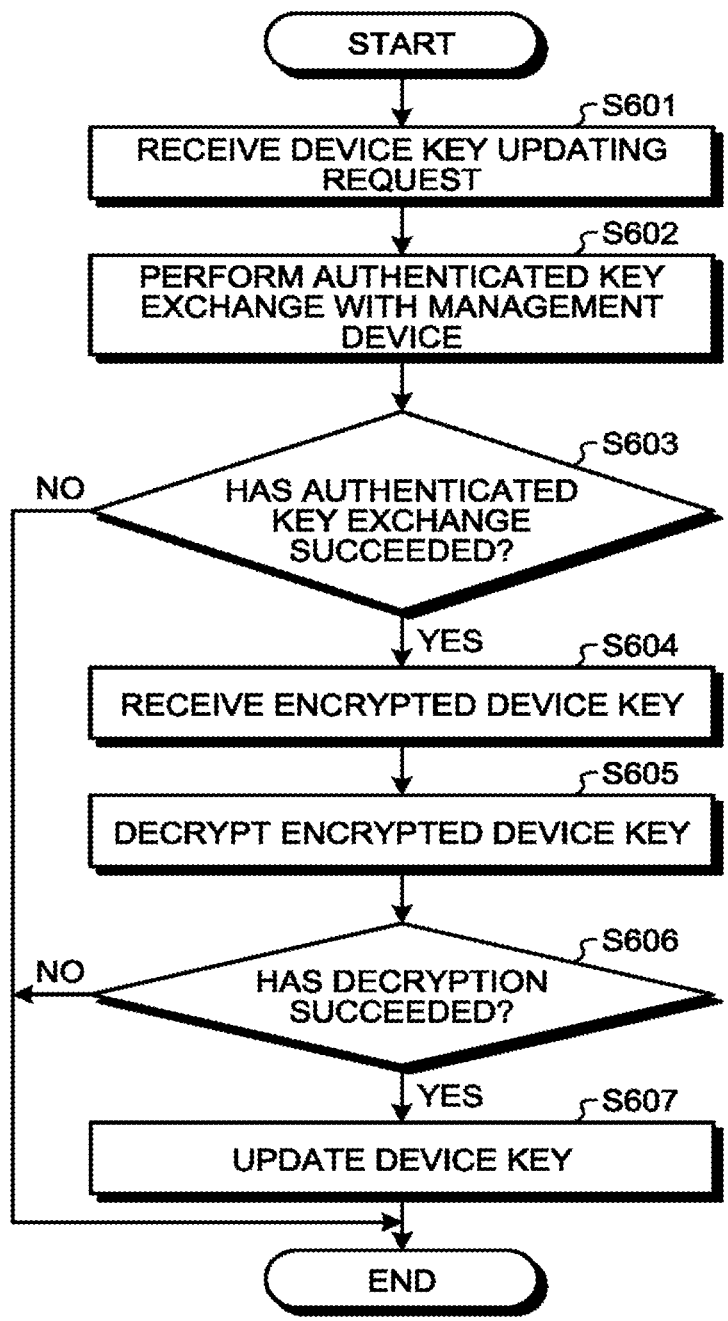
FIG. 12 is a flowchart of a device key updating process performed in the communication device according to the first embodiment.

The device key updating process performed in the communication device 200 will now be explained. FIG. 12 is a flowchart illustrating an example of the device key updating process performed in the communication device 200.

The receiving unit 201 receives a device key updating request (Step S601). The device key updating request is issued by the management device 100, for example. The device key updating request may be issued based on a policy separately specified, e.g., on the regular basis, or an event of a system compromise.

Once the device key updating request is received, the key exchanging unit 211 executes the authenticated key exchange with the management device 100, and establishes the shared key K (Step S602). The device key updating unit 212 determines whether the authenticated key exchange has succeeded (Step S603).

If the authenticated key exchange has succeeded (Yes at Step S603), the receiving unit 201 receives the encrypted device key from the management device 100 (Step S604). The device key updating unit 212 then decrypts the received encrypted device key, using the shared key K (Step S605).

The device key updating unit 212 determines whether the decryption has succeeded (Step S606). If the decryption has succeeded (Yes at Step S606), the device key updating unit 212 updates the device key stored in the device key storage 222 with the decrypted device key (Step S607), and the device key updating process is ended. The device key updating unit 212 may notify the management device 100 that the update has been successful, before the device key updating process is ended.

If the authenticated key exchange has failed (No at Step S603), or the decryption has failed (No at Step S606), the device key updating process is ended without performing the subsequent process. The device key updating unit 212 may notify the management device 100 that the update has failed, before the device key updating process is ended.

Figure 13:
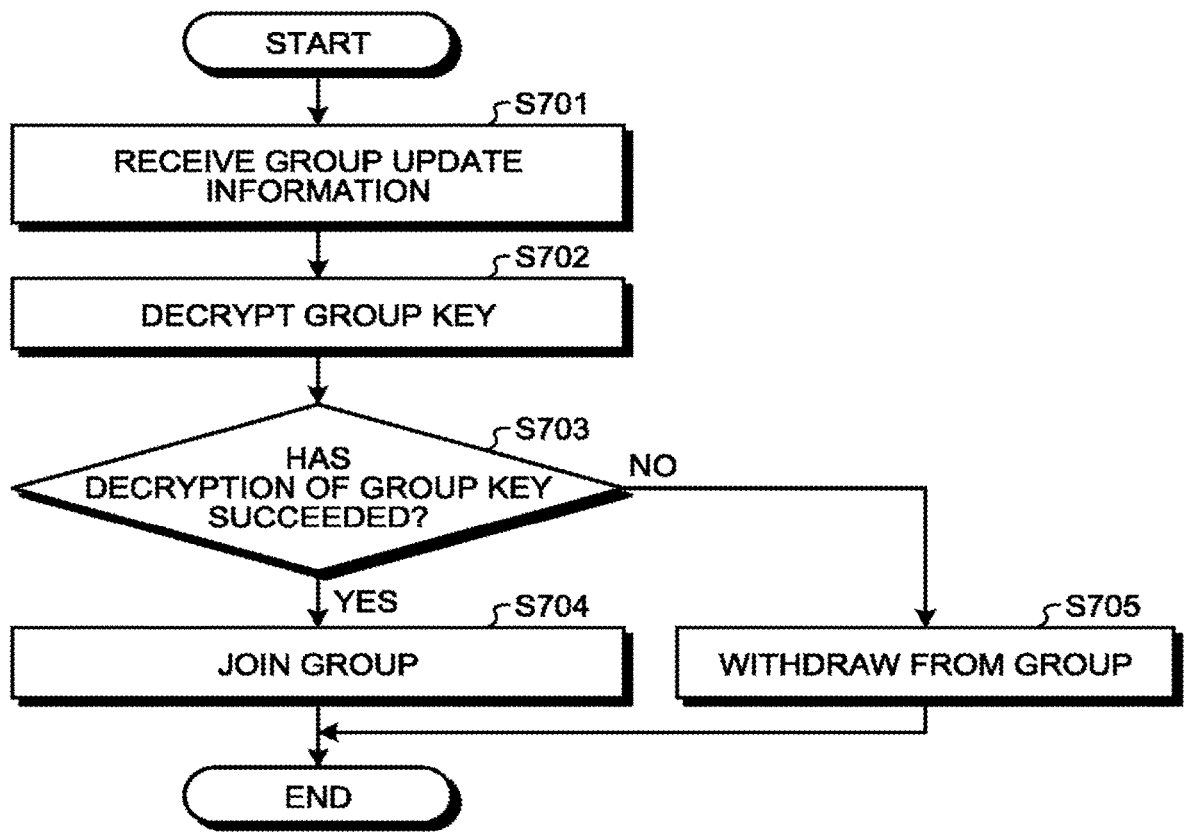
FIG. 13 is a flowchart of a group updating process performed in the communication device according to the first embodiment.

The group updating process performed in the communication device 200 will now be explained. FIG. 13 is a flowchart illustrating an example of the group updating process performed in the communication device 200.

The receiving unit 201 receives the group update information including the group ID for identifying the group to be updated, and the group key data (Step S701). The group updating unit 213 decrypts the group key data using the device key stored in the device key storage 222 (Step S702).

The group updating unit 213 then determines whether the decryption has succeeded (Step S703). If the decryption has succeeded (Yes at Step S703), the group updating unit 213 performs the process of storing the group ID and the group key acquired by the decryption in the group information storage 221, that is, performs a process of joining the group (Step S704). If the communication device 200 has already joined the group designated by the group ID, the group information storage 221 updates the group key stored in a manner paired with the group ID, with the group key acquired by the decryption.

If the decryption has failed (No at Step S703), the group updating unit 213 deletes the group ID and the croup key stored in the group information storage 221, that is, withdraws from the group (Step S705). If the corresponding group ID is not stored in the group information storage 221, this step is skipped.

The transmitting unit 202 may be configured to notify the management device 100 whether the communication device 200 has joined the group, for example, when the group updating process is ended.

First Modification

In the first embodiment, each node in the management tree retains the updated flag and the enabled flag, and the enabled flag is used as the determination information. The determination information is, however, not limited thereto. In a first modification, each node retains the updated flag only, and the updated flag is used as the determination information.

Figure 14:
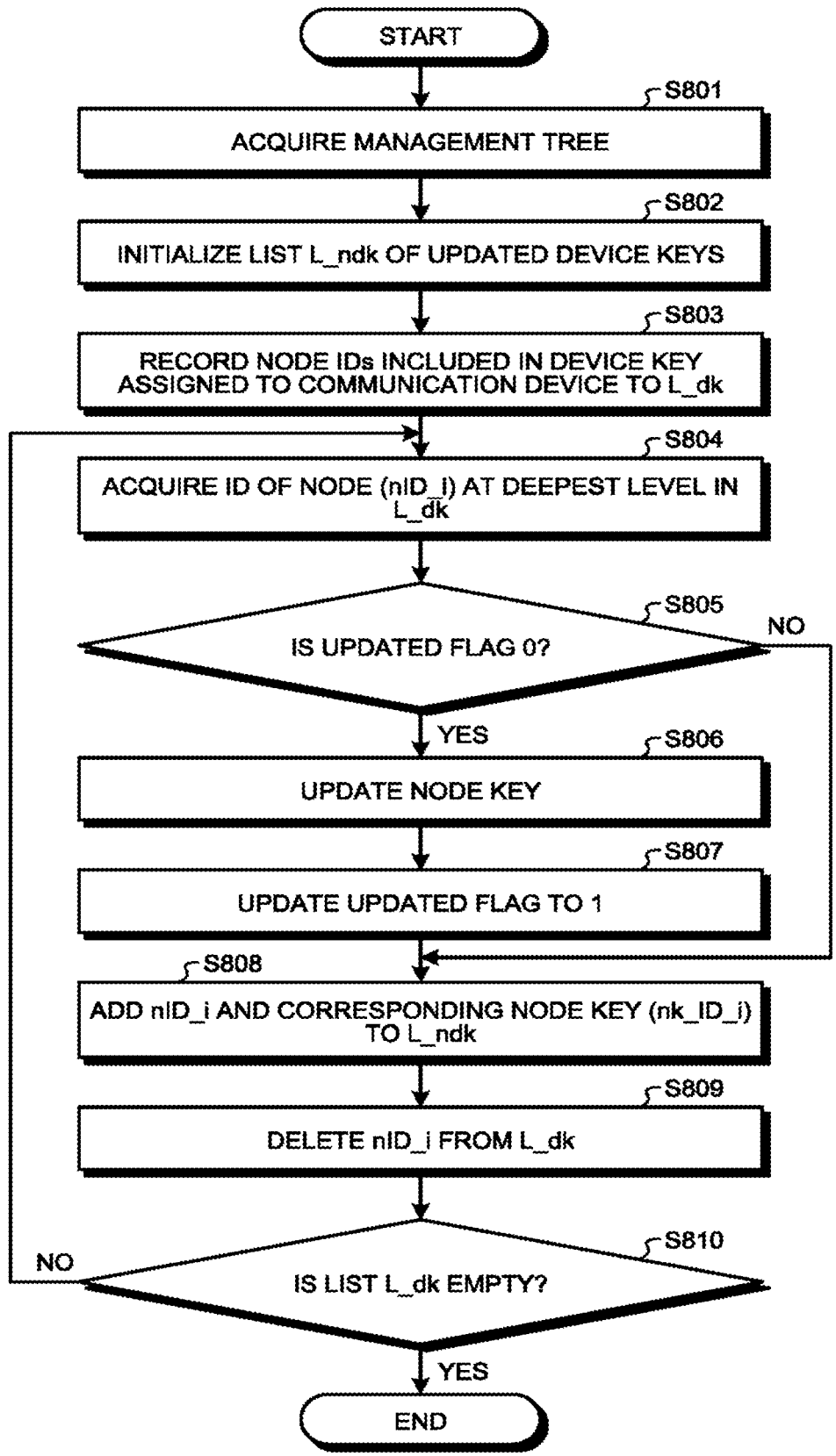
FIG. 14 is a flowchart of a management tree updating process according to a first modification.

FIG. 14 is a flowchart illustrating an example of the management tree updating process according to the first modification. The management tree updating process according to the first modification is the same as FIG. 9 illustrating the management tree updating process according to the first embodiment, except that Steps S308 to S311, that is, except that the process of setting the enabled flag is omitted. The explanation of the management tree updating process is therefore omitted herein.

Figure 15:
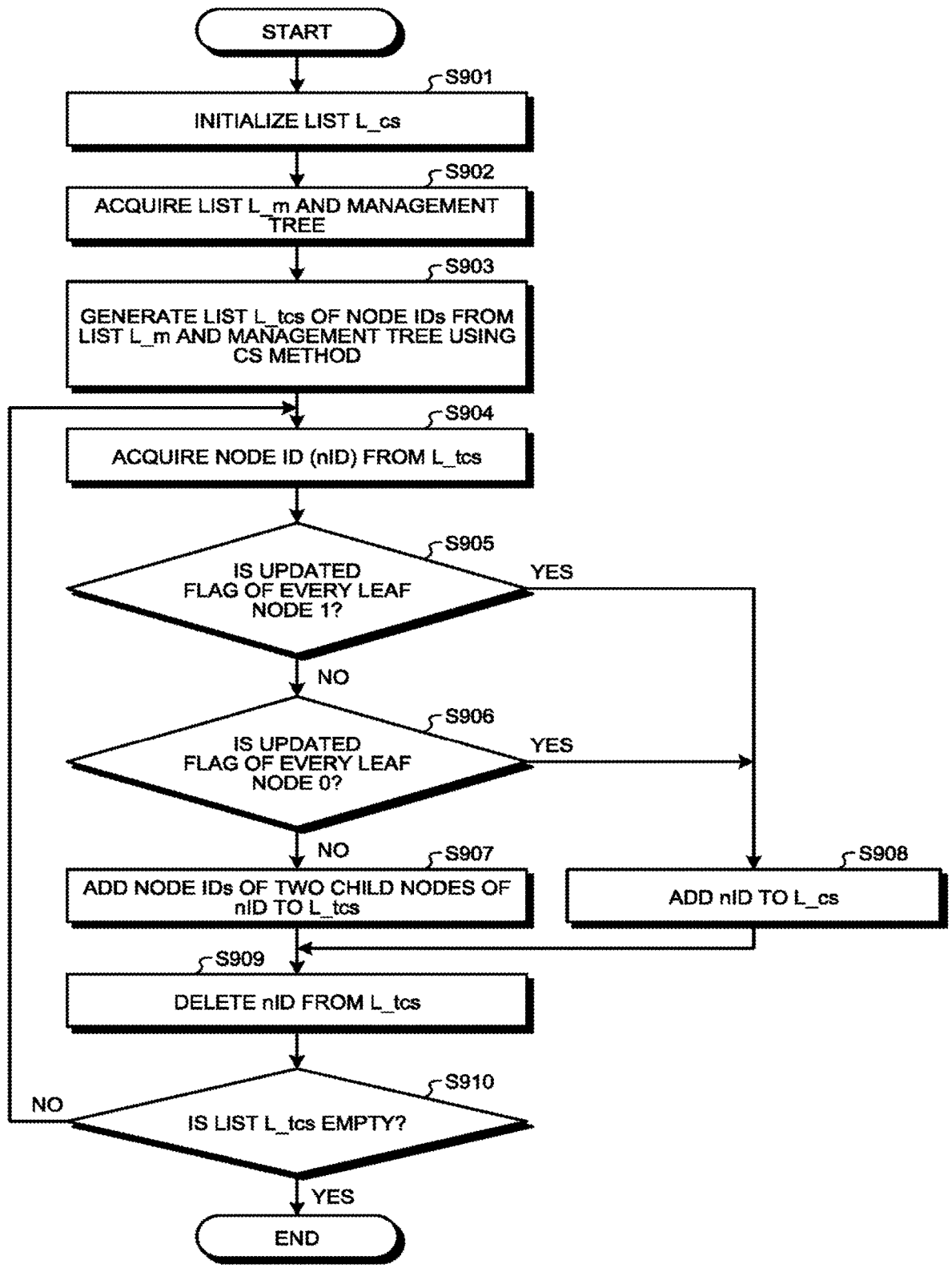
FIG. 15 is a flowchart of a node key selecting process according to the first modification.

FIG. 15 is a flowchart illustrating an example of node key selecting process according to the first modification. In the node key selecting process according to the first modification, Steps S905 to S908 are executed instead of Steps S505 to S507. The remaining process is the same as FIG. 11 illustrating the node key selecting process according to the first embodiment. The explanation of the remaining process is therefore omitted herein.

Steps S905 to S905 will now be explained. The selecting unit 113 determines whether every leaf node of the subtree having the node nID as a root node has its updated flag set to 1 (Step S905). If every leaf node does not have its updated flag set to 1 (No at Step S905), the selecting unit 113 determines whether every leaf node of the subtree having the node nID as a root node has its updated flag set to 0 (Step S906).

If every leaf node has its updated flag set to 1 (Yes at Step S905), or every leaf node has its updated flag set to 0 (Yes at Step S906), the selecting unit 113 adds nID to the list L_cs (Step S908). If not every leaf node has an updated flag 0 (No at Step S906), the selecting unit 113 adds the node IDs of the two child nodes of nID (cnID1, cnID2) to the list L_tcs (Step S907).

Described above is merely an example, and the determination may be made using any other equivalent condition. For example, the selecting unit 113 may determine whether the updated flag of every leaf node of a subtree having nID as a root node is equal. Step S908 may be executed if the flag is equal, and Step S907 is executed if the flag is not equal.

With the configuration described above, the same result as that achieved by the first embodiment can be achieved without using the enabled flag. Furthermore, because it is not necessary to store the enabled flag, the amount of data to be managed can be reduced.

Second Modification

In the first embodiment, the CS method using the management tree and the list L_m of the device IDs of the communication devices 200 belonging to the group are used in acquiring the list L_tcs, and the list L_cs is created using the list L_tcs and the enabled flag. The method for creating the list L_cs is, however, not limited thereto. In a second modification, to begin with, created are a list L_m1 of the device IDs of the communication devices 200 that are members of a group, and whose corresponding leaf nodes have their updated flag set to 1; and another list L_m0 of the device IDs of the communication devices 200 that are members of the group, and whose corresponding leaf nodes have their updated flag set to 0. A node ID list L_tcs1 is generated from the list L_m1 and the management tree using the CS method, and a node ID list L_tcs0 is generated from the list L_m0 and the management tree using the CS method. The list L_cs is then created by merging the list L_tcs1 and the list L_tcs0.

Figure 16:
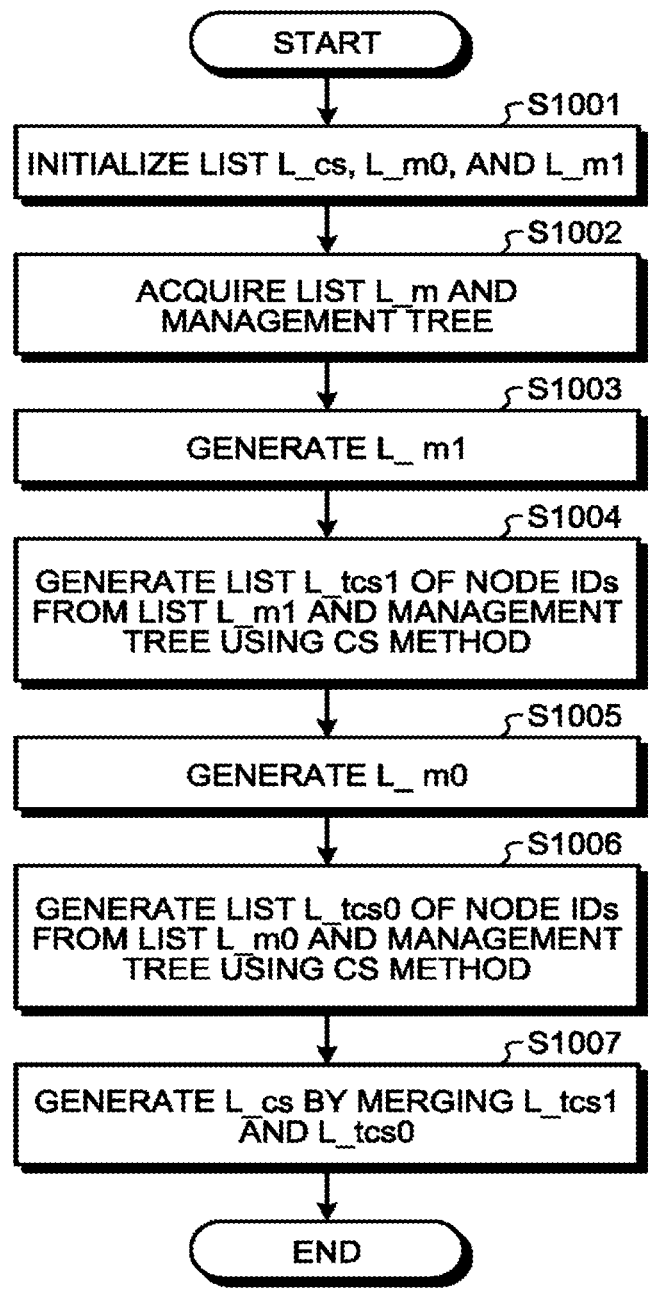
FIG. 16 is a flowchart of a node key selecting process according to a second modification.

FIG. 16 is a flowchart illustrating an example of the node key selecting process according to the second modification. The selecting unit 113 initializes the list L_cs, the list L_m0, and the list L_m1 with an empty set (Step S1001). The selecting unit 113 then reads the list L_m and the management tree (Step S1002)

The selecting unit 113 reads the device ID of every communication device 200 with a leaf node assigned thereto having the updated flag set to 1 from the list L_m, and records the read device ID to the list L_m1 (Step S1003). The selecting unit 113 then calculates the node ID list L_tcs1 from the list L_m1 and the management tree, using the CS method (Step S1004).

The selecting unit 113 then reads the device ID of every communication device 200 with a leaf node assigned thereto having the updated flag set to 0 from the list L_m, and records the read device ID to the list L_m0 (Step S1005). The selecting unit 113 then calculates the node ID list L_tcs0 from the list L_m0 and the management tree using the CS method (Step S1006). The selecting unit 113 generates the list L_cs by merging the list L_tcs1 and the list L_tcs0 (Step S1007).

In the same manner as in the first embodiment, even with the configuration of the node key selecting process according to this modification, the node ID list L_cs required in calculating group key data, which can be decrypted only with the device keys retained by the communication devices 200 included in the list L_m, can be obtained.

Third Modification

The management device 100 may always be connected to a network, but may also be configured to connect to a network to which the communication devices 200 are connected when the update of the device key or the group key becomes necessary.

Furthermore, the management device 100 does not need to be connected with the entire communication devices 200 simultaneously when the device keys are to be updated. The management device 100 and the communication device 200 that is to be updated may be configured to become connected to each other directly using a universal serial bus (USB) connection or a serial connection, for example, when such a connection becomes necessary. With such a configuration, the management device 100 does not need to implement the entire functions according to the first embodiment within the same device, and such functions may be separately implemented, as a device provided with the group key updating function, and another device provided with the device key updating function.

Figure 17:
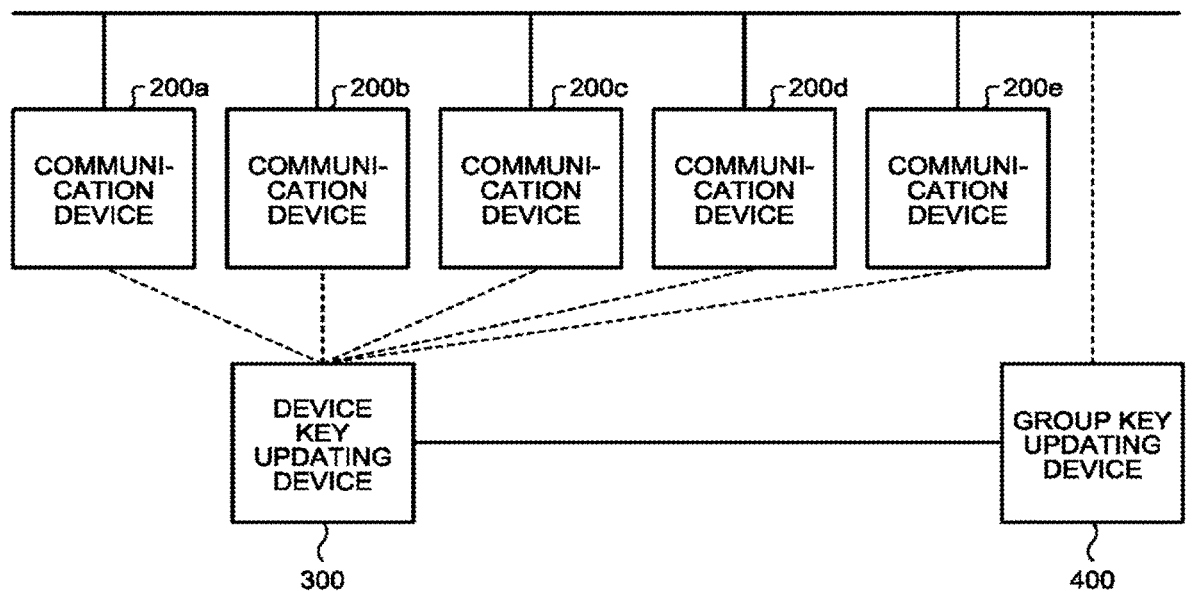
FIG. 17 is a block diagram illustrating an exemplary configuration of a communication system according to a third modification.

FIG. 17 is a block diagram illustrating an exemplary configuration of the communication system according to the third modification. The dotted lines in FIG. 17 indicate communication channels that are connected as required, and not always connected. Illustrated in FIG. 17 is an example in which the management device 100 is implemented by a group key updating device 400 provided with the group key updating function, and a device key updating device 300 provided with the device key updating function.

Fourth Modification

In the first embodiment, a one-bit updated flag is used as the determination information, but, as the determination information, generation information (e.g., version information) of the device key may also be used. In such a configuration, a node with newer generation information than those of the other nodes is deemed equivalent of the updated flag=1, and a node having older generation information than those of the other nodes is deemed equivalent of the updated flag=0.

In the manner described above, in the first embodiment, the node key (device key) that can be used in encrypting the group key is determined using the determination information (such as the enabled flag and the updated flag). In this manner, the group key can be distributed even before the update of the device keys of the entire communication devices 200 is completed.

Second Embodiment

In a second embodiment, when a device key is updated, the communication device is assigned to a leaf node that is different from that the communication device has been assigned before the device key is updated, in the updated management tree. The position of the leaf node to which the communication device is assigned is determined based on information such as the past members of the group, or the communication costs required in the group key distribution, for example, so that an ancestor node of the communication devices that are frequently put into the same group is positioned closer to such leaf nodes as much as possible. By updating the device keys in the manner described above, the communication costs required in the distribution of the group key can be reduced, after the device keys are updated.

The way in which the position to which the communication device is assigned is determined described above is merely an example. The position of the leaf node to which each of the communication devices is assigned may be determined based on communication history, the system configuration before the update, and the system configuration after the update, for example, so that less amount of the group key data is required in the distribution of the group key in the system after the update.

The configuration of the communication system according to the second embodiment is the same as that illustrated in FIG. 1, so that the explanation thereof is omitted herein. In the second embodiment, however, the functions of the management device are different from those according to the first embodiment. Because the communication device is the same as that according to the first embodiment, the same reference numerals are given, and the explanations thereof are omitted herein.

Figure 18:
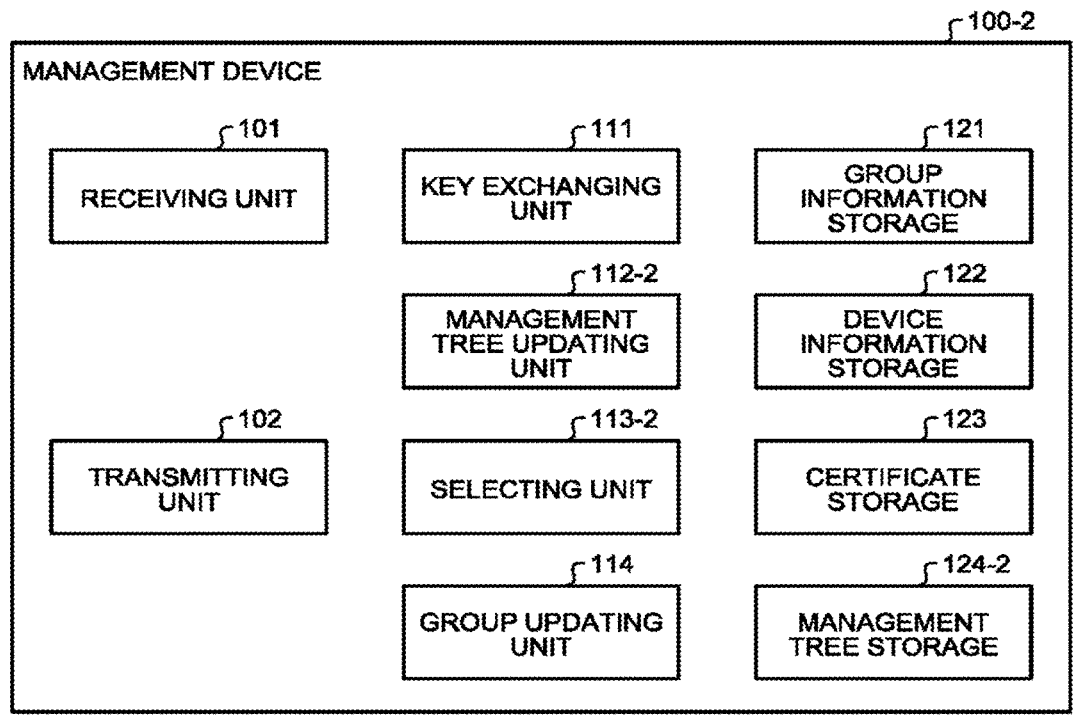
FIG. 18 is a block diagram of a management device according to a second embodiment.

FIG. 18 is a block diagram illustrating an exemplary functional configuration of a management device 100-2 according to the second embodiment. As illustrated in FIG. 18, the management device 100-2 includes the receiving unit 101, the transmitting unit 102, the group information storage 121, the device information storage 122, the certificate storage 123, a management tree storage 124-2, the key exchanging unit 111, a management tree updating unit 112-2, the selecting unit 113-2, and the group updating unit 114.

In the second embodiment, the management tree storage 124-2, the management tree updating unit 112-2, and the selecting unit 113-2 are different from those according to the first embodiment. Other configurations and functions are the same as those illustrated in FIG. 2 that is a block diagram of the management device 100 according to the first embodiment, so the same reference numerals are given, and explanations thereof are omitted herein.

Figure 19:
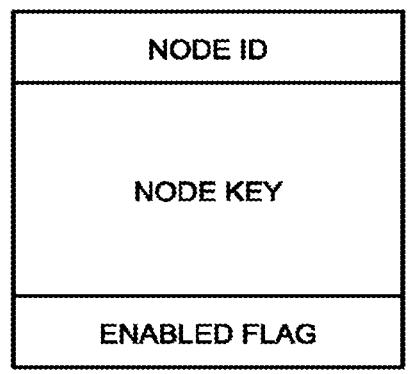
FIG. 19 is a schematic illustrating an example of information assigned to a node in the management tree according to the second embodiment.

The management tree storage 124-2 stores therein a management tree for managing the device keys. In the second embodiment, the information retained by each node of the management tree is different from that according to the first embodiment. FIG. 19 is a schematic illustrating an example of information assigned to a node in the management tree according to the second embodiment. As illustrated in FIG. 19, each of the node is assigned with a node ID, a node key, and an enabled flag.

Furthermore, in the embodiment, the management tree before the device keys are updated (unupdated management tree) and the management tree after the device keys are updated (updated management tree) are both stored in the management tree storage 124-2. In other words, the management tree storage 124-2 stores therein an unupdated management tree including a plurality of nodes with the respective node keys assigned thereto unupdated (first binary tree), and an updated management tree including a plurality of nodes with the respective node keys assigned thereto updated (second binary tree).

The management tree updating unit 112-2 performs a process of updating the device key shared with the communication device 200. For example, the management tree updating unit 112-2 generates an updated management tree in such a manner that an ancestor node of a plurality of leaf nodes, which correspond to a plurality of respective communication devices 200 belonging to the same group, is positioned closer to such leaf nodes, compared with that in the unupdated management tree, and stores the updated management tree in the management tree storage 124-2.

The selecting unit 113-2 selects the subtree having only the leaf nodes that are assigned to the respective communication devices 200 to which the group key is distributed, from the subtrees of the management trees. The selecting unit 113-2 selects, for example, at least of a subtree (first subtree) including the leaf nodes corresponding to the communication devices 200 that are included in the group from the unupdated management tree, and a subtree (second subtree) including the leaf nodes corresponding to the communication devices 200 that are included in the group from the updated management tree.

A device key updating process performed in the communication system according to the second embodiment configured in the manner described above will now be explained. The entire sequence of the device key updating process according to the second embodiment is the same as that according to the first embodiment illustrated in FIGS. 6 and 7, so explanations thereof are omitted herein.

The management tree updating pre-process (Step S103 in FIG. 7), the management tree updating process (Step S107 in FIG. 7), and the group updating process (Step S112 in FIG. 7) according to the second embodiment are different from those in the first embodiment. The remaining process is the same as that according to the first embodiment, so explanations thereof are omitted herein.

Figure 20:
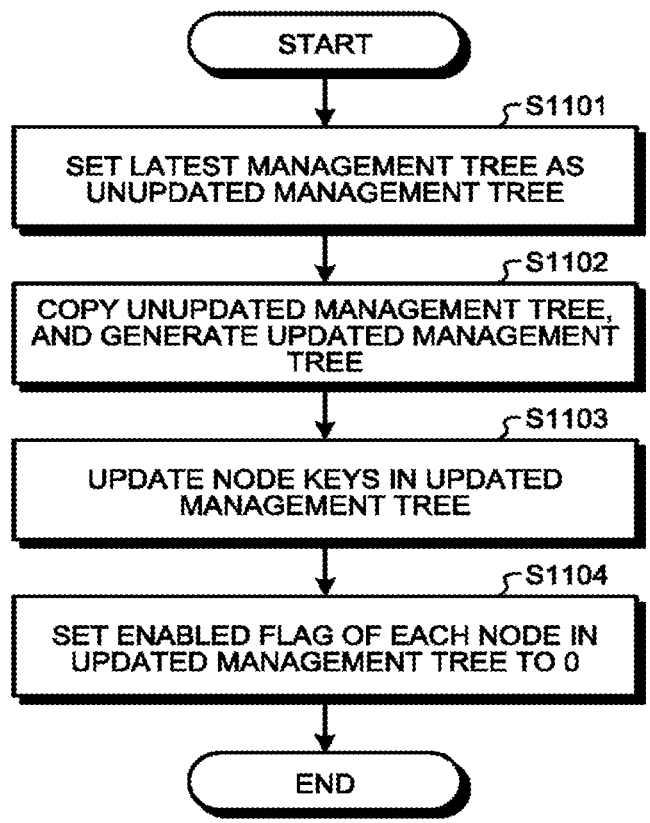
FIG. 20 is a flowchart of a management tree updating pre-process according to the second embodiment.

FIG. 20 is a flowchart illustrating an example of the management tree updating pre-process according to the second embodiment. The management tree updating unit 112-2 stores the latest management tree in the management tree storage 124-2 as the unupdated management tree (Step S1101). The management tree updating unit 112-2 then generates an updated management tree by duplicating the unupdated management tree (Step S1102). The management tree updating unit 112-2 then updates the node key assigned to each node of the updated management tree with a newly generated key (Step S1103). As the method for generating the key, any method, such as a method of randomly generating a key, may be used. The management tree updating unit 112-2 disables every node included in the updated management tree, by setting the enabled flag retained by every node to 0 (Step S1104). The management tree updating unit 112-2 then stores the updated management tree in the management tree storage 124-2, for example, and the management tree updating pre-process is ended.

Figure 21:
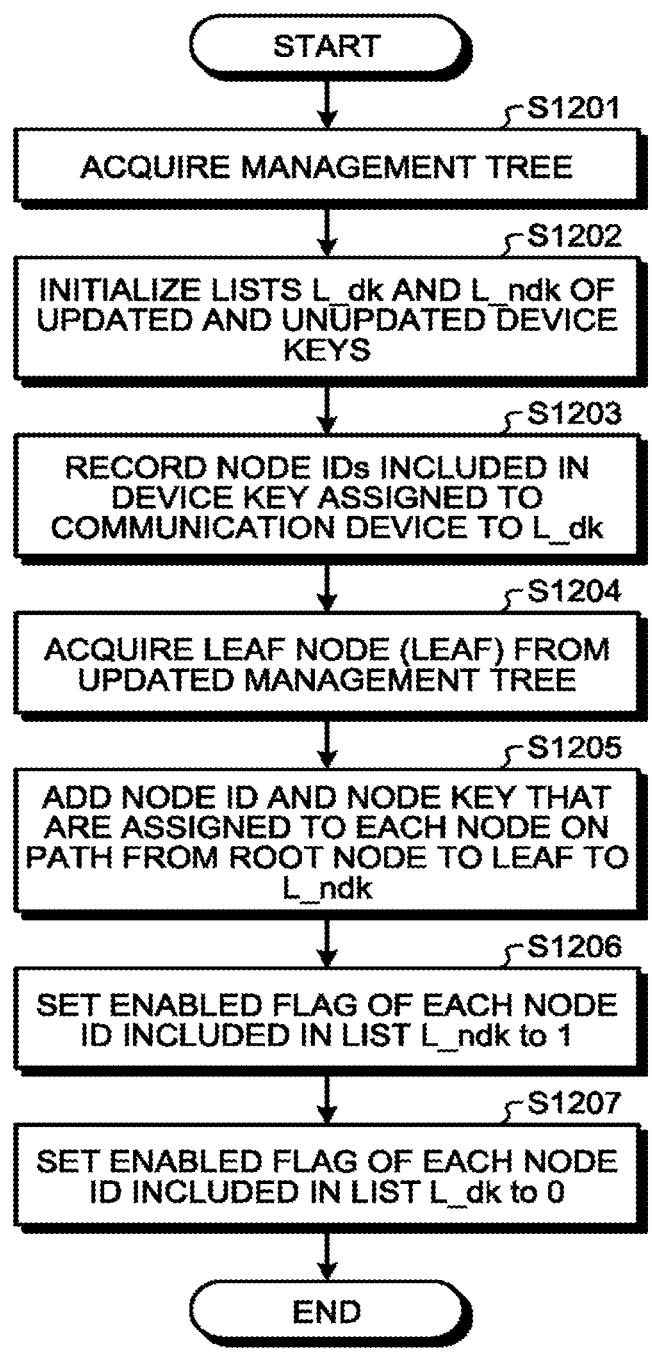
FIG. 21 is a flowchart of a management tree updating process according to the second embodiment.

FIG. 21 is a flowchart illustrating an example of a management tree updating process according to the second embodiment. The management tree updating unit 112-2 reads the unupdated management tree from the management tree storage 124-2 (Step S1201). The management tree updating unit 112-2 initializes the list L_dk storing therein the node IDs assigned to the device key of the communication device x, the device key not having been updated yet (unupdated device key), and the list L_ndk storing therein an updated device key, with an empty set (Step S1202). The management tree updating unit 112-2 then records the node IDs included in the unupdated device key assigned to the communication device x to the list L_dk (Step S1203).

The management tree updating unit 112-2 selects one leaf node LEAF, from the leaf nodes having their enabled flag set to 0 in the updated management tree, as the leaf node to which the communication device x is assigned (Step S1204). As mentioned earlier, the position of the leaf node to be selected is selected as appropriate, based on history information or a policy related to a selection method.

The management tree updating unit 112-2 records the pairs of the node ID and the node key that are assigned to the respective nodes on the path from the root node to the leaf node of the updated management tree, to the list L_ndk (Step S1205).

The management tree updating unit 112-2 sets the enabled flag of the node that is included in the updated management tree, and is identified by the node ID recorded in the list L_ndk to 1 (Step S1206). The management tree updating unit 112-2 also sets the enabled flag of the node that is included in the unupdated management tree, and is identified by the node ID recorded in the list L_dk to 0 (Step S1207).

The group updating process according to the second embodiment will now be explained. In the group updating process at Step S112 in FIG. 7, the management device 100-2 performs the group updating process that is the same as that according to the first embodiment illustrated in FIG. 10. In the second embodiment, however, the node key selecting process at Step S402 in FIG. 10 is different from the corresponding process in the first embodiment. Therefore, explained below is the node key selecting process according to the second embodiment, and an explanation of the remaining process will be omitted.

Figure 22:
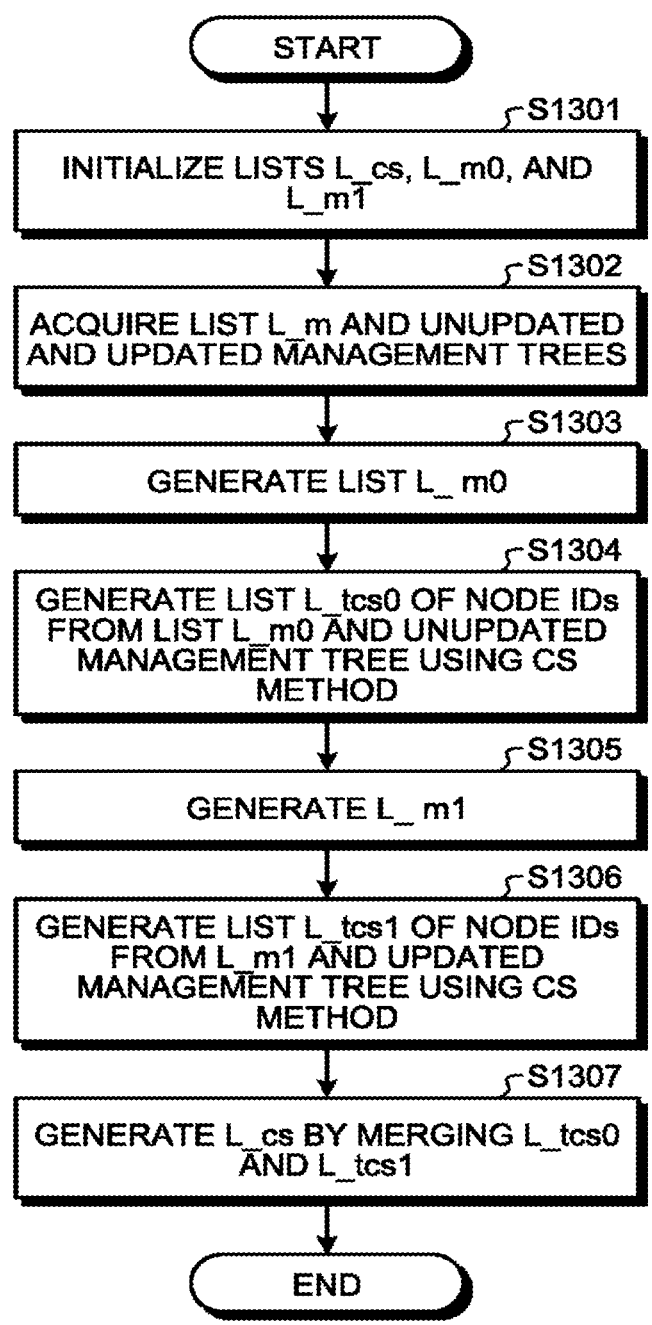
FIG. 22 is a flowchart of a node key selecting process according to the second embodiment.

FIG. 22 is a flowchart illustrating an example of the node key selecting process according to the second embodiment. The selecting unit 113-2 initialises the list L_cs, the list L_m0, and the list L_m1 with an empty set (Step S1301). In the embodiment, the list L_m0 is a list for recording the device IDs of the communication devices 200 that are the member of a group, and whose corresponding leaf nodes in the unupdated management tree have the enabled flag set to 1. The list L_m1 is a list for recording the device IDs of the communication devices 200 that are the members a group, and whose corresponding leaf nodes in the updated management tree have the enabled flag set to 1.

The selecting unit 113-2 reads the list L_m of the device IDs of the communication devices that are to be the members of the group, the unupdated management tree, and the updated management tree (Step S1302). The selecting unit 113-2 identifies the communication devices 200 that are assigned with leaf nodes whose enabled flag is 1, among the leaf nodes of the unupdated management tree, and records the communication devices 200 thus identified and also included in the list L_m to the list L_m0 (Step S1303). The selecting unit 113-2 then obtains the node ID list L_tcs0 from the list L_m0 and the unupdated management tree, using the CS method (Step S1304).

The selecting unit 113-2 then identifies the communication devices 200 that are assigned with the leaf nodes whose enabled flag is 1, among the leaf nodes included in the updated management tree, and records the communication devices 200 thus identified and also included in the list L_m, to the list L_m1 (Step S1305). The selecting unit 113-2 then obtains the node ID list L_tcs1 from the list L_m1 and the updated management tree, using the CS method (Step S1306).

The selecting unit 113-2 generates the list L_cs by merging the list L_tcs0 and the list L_tcs1 (Step S1307). The selecting unit 113-2 then deletes the unupdated management tree from the management tree storage 124-2, and establishes the updated management tree as a new management tree. The selecting unit 113-2 may also store the unupdated management tree as backup data, without deleting the unupdated management tree.

The group key is then encrypted using the node key selected in the manner described above (Step S404 in FIG. 10), and transmitted to the communication device 200 to be updated (Step S405 in FIG. 10). Furthermore, in the second embodiment, a set of node keys assigned to the nodes on the path from the root node to the leaf node of the updated management tree are then transmitted to the communication device 200 as the updated device key (Step S13 in FIG. 6).

Fifth Modification

In the management tree updating pre-process according to the second embodiment, the node keys for the entire updated management tree are created (FIG. 20), and the device keys are re-assigned, in the management tree updating process (FIG. 21). In a management tree updating pre-process according to a fifth modification, however, instead of creating the complete updated management tree, the updated management tree is generated successively by creating the node keys required for the device key that is to be updated in the management tree updating process. With such a configuration, the amount of information that needs to be retained during the updating process can be reduced.

Figure 23:
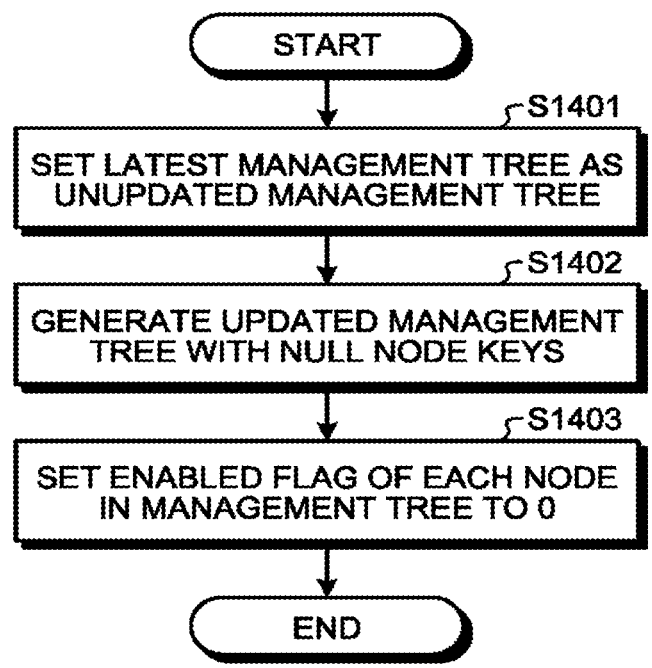
FIG. 23 is a flowchart of a management tree updating pre-process according to the fifth modification.

FIG. 23 is a flowchart illustrating an example of the management tree updating pre-process according to the fifth modification. The management tree updating unit 112-2 stores the latest management tree in the management tree storage 124-2, as the unupdated management tree (Step S1401). The management tree updating unit 112-2 generates a binary tree having the same number of leaf nodes as those in the unupdated management tree, and having each leaf node assigned with a node ID, as the updated management tree (Step S1402). The management tree updating unit 112-2 disables every node included in the updated management tree, by setting the enabled flag retained by every node to 0 (Step S1403). The management tree updating unit 112-2 then stores the updated management tree in the management tree storage 124-2, for example, and the management tree updating pre-process ended.

Figure 24:
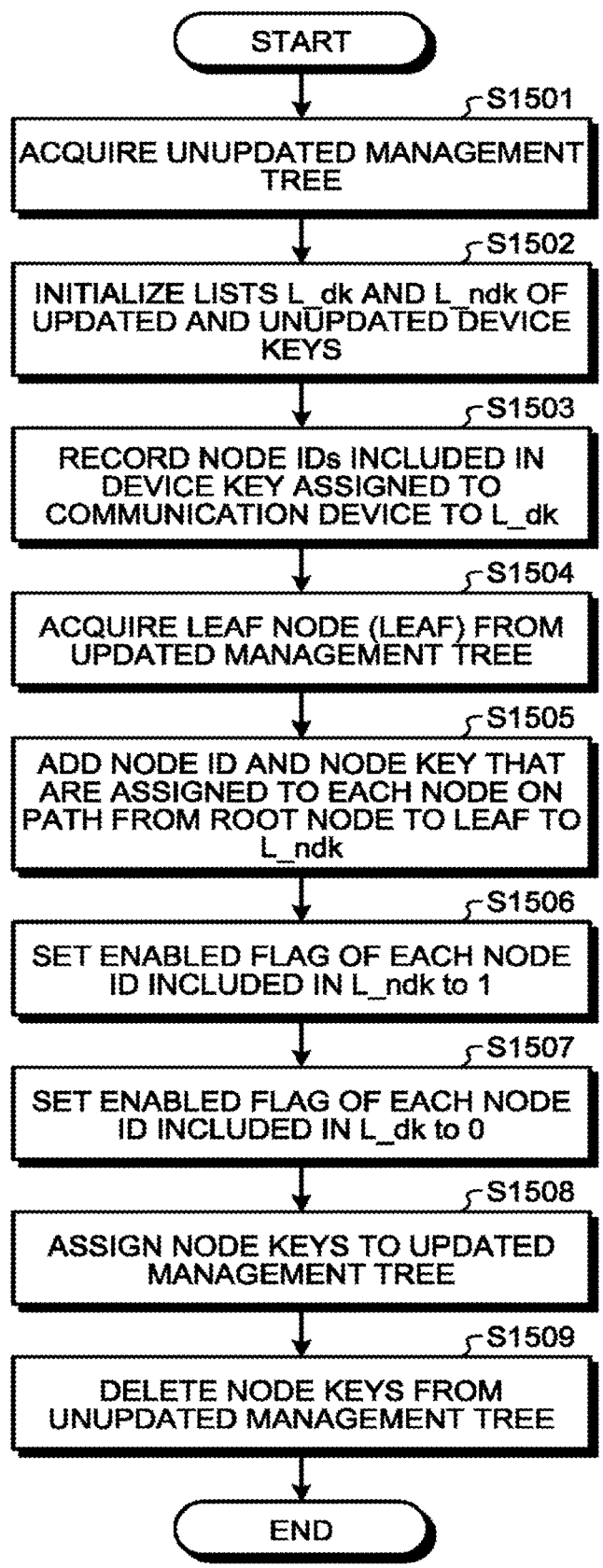
FIG. 24 is a flowchart of a management tree updating process according to the fifth modification.

FIG. 24 is a flowchart illustrating an example of the management tree updating process according to the fifth modification. The process from Step S1501 to Step S1504 is the same as the process from Step S1201 to Step S1204 in the management tree updating process according to the second embodiment (FIG. 21), so explanations thereof are omitted herein.

The management tree updating unit 112-2 identifies the node IDs assigned to the respective nodes on the path from the root node to the LEAF in the updated management tree. For the nodes corresponding to the identified node IDs and having their node keys recorded, the management tree updating unit 112-2 records the nodes ID in a manner paired with the respective node keys, to the list L_ndk. For the nodes corresponding to the node IDs and having a null node key, the management tree updating unit 112-2 records the node IDs in a manner paired with respective newly generated keys, to the list L_ndk (Step S1505). As the method for generating the keys, any method, such as a method of randomly generating a key, may be used.

Because the processes at Step S1506 and Step S1507 are the same as those at Step S1206 and Step S1207 in the management tree updating process according to the second embodiment (FIG. 21), explanations thereof are omitted herein.

For the nodes having a null node key in the updated management tree, and having their node IDs recorded in the list L_ndk, the management tree updating unit 112-2 updates the updated management tree by replacing the null node key with the node key recorded in the list L_ndk (Step S1508). The management tree updating unit 112-2 deletes the node key of the node identified by the node ID recorded in the list L_dk from the unupdated management tree, by replacing the node key with a null node key (Step S1509).

Sixth Modification

In the same manner as the third modification of the first embodiment, the management device 100-2 may be configured to be connected to a network to which the communication devices 200 are connected when the update of device keys or a group key becomes necessary.

Furthermore, the management device 100-2 does not need to be connected with the entire communication devices 200 simultaneously when the device keys are to be updated. The management device 100-2 and the communication device 200 that is to be updated may be configured to become connected to each other directly using a USB connection or a serial connection, for example, when such a connection becomes necessary. With such a configuration, the management device 100-2 does not need to implement the entire functions according to the second embodiment within the same device, and may be separately implemented, as a device provided with the group key updating function, and another device provided with the device key updating function. An exemplary configuration in such a case is the same as that according to the third modification illustrated in FIG. 17.

Seventh Modification

In the second embodiment, the unupdated management tree and the updated management tree are used while the device key updating process is being performed, but these management trees may be managed using management tree generation information. In such a configuration, the unupdated management tree and the updated management tree are distinguished from each other by appending newer generation information to the updated management tree when the updated management tree is generated, than that appended to the existing management tree.

In the manner described above, in the second embodiment, the unupdated and updated management trees are separately managed, and the node keys (device keys) that can be used in encrypting the group key are determined from each of these management trees. In this manner, the group key can be distributed even until updating of the device keys of the entire communication devices is completed. Furthermore, in the second embodiment, the updated management tree is determined, by referring to the grouping or the like, in such a manner that an ancestor node of the communication devices that are frequently put into the same group is positioned closer to these nodes, as much as possible. In this manner, the communication costs required in the distribution of the group key can be reduced.

As described above, according to the first and the second embodiments, the group key can be distributed even until updating of the device keys of the entire communication devices is completed.

Figure 25:
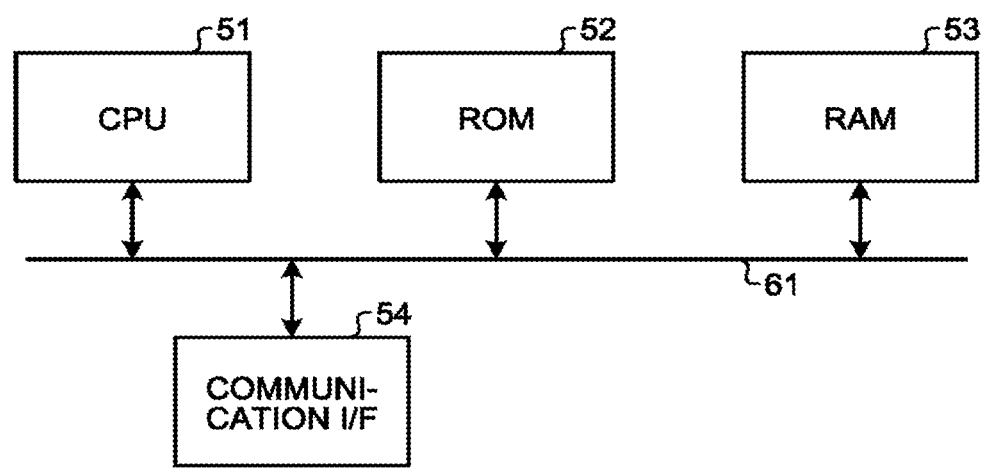
FIG. 25 is a schematic for explaining an exemplary hardware configuration of the device according to the embodiments.

A hardware configuration of the device (the management device, the communication device) according to the embodiments will now be explained with reference to FIG. 25. FIG. 25 is a schematic for explaining an exemplary hardware configuration of the device according to the embodiment.

The device according to the embodiment includes a control device such as a CPU 51, a storage device such as a read-only memory (ROM) 52 or a RAM 53, a communication interface (I/F) 54 for connecting to a network and establishing communication, and a bus 61 connecting these units.

A computer program executed by the device according to the embodiment is provided in a manner incorporated in the ROM 52 or the like in advance.

The computer program executed by the device according to the embodiment may be configured to be provided as a computer program product, in a manner recorded in a computer-readable recording medium such as a compact disc read-only memory (CD-ROM), a flexible disk (FD), a compact disc recordable (CD-R), or a digital versatile disc (DVD), as a file in an installable or executable format.

The computer program executed by the device according to the embodiment may be configured to be stored in a computer connected to a network such as the Internet, and made available for download over the network. Furthermore, the computer program executed by the device according to the embodiment may be configured to be provided or distributed over a network such as the Internet.

The computer program executed by the device according to the embodiment enables a computer to function as the units of the device described above. Such a computer can cause the CPU 51 to read the computer program from a computer-readable storage medium onto the main memory, and to execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management device comprising:
a management tree storage configured to store therein a binary tree including a plurality of nodes that is assigned with respective node keys;
one or more processors configured to:
update at least one of the node keys;
select at least one of a first subtree and a second subtree, the first subtree and the second subtree being subtrees including leaf nodes of the binary tree, the leaf nodes corresponding to respective communication devices included in a group, the first subtree including only leaf nodes with the respective node keys assigned thereto not having been updated, the second subtree including only leaf nodes with the respective node keys assigned thereto having been updated; and
transmit a group key encrypted using a node key assigned to a root node of the selected subtree, wherein
the management tree storage is configured to store therein a first binary tree including a plurality of nodes with the respective node keys assigned thereto not having been updated yet, and a second binary tree including a plurality of nodes with the respective node keys assigned thereto having been updated, and
the one or more processors are configured to select at least one of the first subtree that is a subtree of the first binary tree and the second subtree that is a subtree of the second binary tree.

2. The management device according to claim 1, wherein the one or more processors are configured to generate the second binary tree in such a manner that a plurality of leaf nodes, corresponding to a plurality of respective communication devices belonging to a same group, has a second ancestor node, a level of the second ancestor node being closer to the leaf nodes compared with a level of a first ancestor node that is an ancestor node of the plurality of leaf nodes in the first binary tree, and store the second binary tree in the management tree storage.

3. The management device according to claim 2, wherein the one or more processors are configured to transmit the node key having been updated to a communication device corresponding to a leaf node of the second binary tree.

4. The management device according to claim 3, wherein the one or more processors are configured to transmit a set of node keys assigned to respective nodes between a root node and a first leaf node of the second binary tree to the communication device corresponding to the first leaf node.

5. The management device according to claim 1, wherein the one or more processors are configured to select a subtree including leaf nodes of the first binary tree, the leaf nodes corresponding to respective communication devices included in a group, based on a complete subtree (CS) method, to select the first subtree from the selected subtree, to select a subtree including leaf nodes of the second binary tree, the leaf nodes corresponding to the respective communication devices included in the group, based on the CS method, and to select the second subtree from the selected subtree.

6. A management method comprising:
updating at least one of node keys of a binary tree including a plurality of nodes that is assigned with the respective node keys;
selecting at least one of a first subtree and a second subtree, the first subtree and the second subtree being subtrees including leaf nodes of the binary tree, the leaf nodes corresponding to respective communication devices included in a group, the first subtree including only leaf nodes with the respective node keys assigned thereto not having been updated, the second subtree including only leaf nodes with the respective node keys assigned thereto having been updated; and
transmitting a group key encrypted with a node key assigned to a root node of the selected subtree, wherein
the selecting includes selecting at least one of a first subtree that is a subtree of a first binary tree and a second subtree that is a subtree of a second binary tree,
the first binary tree and the second binary tree are stored in management tree storage,
the first binary tree includes a plurality of nodes with the respective node keys assigned thereto not having been updated yet, and
the second binary tree includes a plurality of nodes with the respective node keys assigned thereto having been updated.

7. The management method according to claim 6, further comprising:
generating the second binary tree in such a manner that a plurality of leaf nodes, corresponding to a plurality of respective communication devices belonging to a same group, has a second ancestor node, a level of the second ancestor node being closer to the leaf nodes compared with a level of a first ancestor node that is an ancestor node of the plurality of leaf nodes in the first binary tree, and
storing the second binary tree in the management tree storage.

8. The management method according to claim 6, wherein the selecting includes selecting a subtree including leaf nodes of the first binary tree, the leaf nodes corresponding to respective communication devices included in a group, based on a complete subtree (CS) method, selecting the first subtree from the selected subtree, selecting a subtree including leaf nodes of the second binary tree, the leaf nodes corresponding to the respective communication devices included in the group, based on the CS method, and selecting the second subtree from the selected subtree.

* * * * *